US008910734B2

(12) United States Patent
Salter et al.

(10) Patent No.: US 8,910,734 B2
(45) Date of Patent: Dec. 16, 2014

(54) ROBOTIC BALL DEVICE WITH IMPROVED ROBUSTNESS AND A MULTITUDE OF INTERACTIVE AND SENSING CAPABILITIES

(75) Inventors: Tamie Salter, Canton-de-Hatley (CA); Serge Caron, St-Basile-le-Grand (CA); François Ferland, Sherbrooke (CA); Matthieu Tanguay, Quebec (CA)

(73) Assignee: 7312903 Canada, Inc., Canton-de-Hatley (CA)

( * ) Notice: Subject to any disclaimer, the term of this patent is extended or adjusted under 35 U.S.C. 154(b) by 0 days.

(21) Appl. No.: 13/823,011

(22) PCT Filed: Sep. 28, 2011

(86) PCT No.: PCT/CA2011/050604
§ 371 (c)(1),
(2), (4) Date: May 21, 2013

(87) PCT Pub. No.: WO2012/040849
PCT Pub. Date: Apr. 5, 2012

(65) Prior Publication Data
US 2013/0233630 A1 Sep. 12, 2013

Related U.S. Application Data

(60) Provisional application No. 61/387,567, filed on Sep. 29, 2010.

(51) Int. Cl.
*B62D 61/00* (2006.01)
(52) U.S. Cl.
USPC .................................. 180/21; 464/159; 901/1
(58) Field of Classification Search
USPC .......... 180/21; 280/3, 7.15; 701/99; 440/4, 6, 440/12.57, 21; 464/159; 901/1
See application file for complete search history.

(56) References Cited

U.S. PATENT DOCUMENTS 2,675,243 A     4/1954   King
3,798,835 A *   3/1974   McKeehan .................... 446/442
(Continued)

FOREIGN PATENT DOCUMENTS

| JP | 03182290 A | * | 8/1991 | ............. A63H 17/00 |
| JP | 2000218578 A | * | 8/2000 | ............... B25J 13/00 |

OTHER PUBLICATIONS

International Search Report for International Application PCT/CA2011/050604, dated Dec. 5, 2011.

*Primary Examiner* — Faye M. Fleming
(74) *Attorney, Agent, or Firm* — Sean D. Detweiler, Esq.; Morse, Barnes-Brown & Pendleton, P.C.

(57) ABSTRACT

A robotic ball device having a center point and an axis of rotation passing through the center point around which the robotic ball device rotates during motion in a forward linear direction includes a housing and a defined pathway located on an inner face of the housing that forms a closed loop around the axis of rotation. A rolling member is contained in the housing and movably disposed on the defined pathway. An actuator is coupled to the rolling member for actuating rotation of the rolling member. A weighted component is operationally coupled to the rolling member, and the weighted component is sufficiently heavy to maintain the rolling member, during a motion in the forward linear direction, at a substantially constant angular position in a forward vertical plane, which dissects the rolling member, relative to an origin in a moving frame of reference that moves with the robotic ball device.

20 Claims, 34 Drawing Sheets

(56) References Cited

U.S. PATENT DOCUMENTS

| | | |
|---|---|---|
| 5,058,901 A | 10/1991 | Salvino |
| 5,437,579 A | 8/1995 | Salvino |
| 5,533,921 A * | 7/1996 | Wilkinson .................... 446/409 |
| 6,227,933 B1 | 5/2001 | Michaud et al. |
| 6,734,685 B2 | 5/2004 | Rudrich |
| 8,099,189 B2 * | 1/2012 | Kaznov et al. ................. 700/245 |
| 8,571,781 B2 * | 10/2013 | Bernstein et al. ............... 701/99 |
| 2001/0022352 A1 | 9/2001 | Rudrich |
| 2008/0105473 A1 | 5/2008 | Lubean |
| 2010/0032224 A1 * | 2/2010 | Liu ............................... 180/218 |
| 2011/0060492 A1 | 3/2011 | Kaznov |
| 2012/0009845 A1 * | 1/2012 | Schmelzer .................... 446/431 |

* cited by examiner

ROBOTIC BALL DEVICE WITH IMPROVED ROBUSTNESS AND A MULTITUDE OF INTERACTIVE AND SENSING CAPABILITIES

RELATED APPLICATIONS

This application is a national stage filing under 35 U.S.C. 371 of International Application No. PCT/CA2011/050604, filed Sep. 28, 2011, which claims priority to, and the benefit of, U.S. Provisional Application No. 61/387,567, filed Sep. 29, 2010, for all subject matter common to both applications. The disclosure of the above-referenced applications are hereby incorporated herein by reference in their entirety. International Application PCT/CA2011/050604 was published under PCT Article 21(2) in English.

FIELD OF THE INVENTION

The present invention is directed to a robotic ball device. More particularly, the present invention relates to a robotic ball device having a housing and a rolling member contained within the housing, the rolling member being disposed on a defined pathway located on an inner face of the robotic ball device.

BACKGROUND OF THE INVENTION

Robotic ball devices possess the potential to be utilized in a wide variety of scenarios, including in education, recreation, military/defense, industry, and others. Autonomous robotic ball devices may be especially useful in such settings, since autonomous robotic ball devices are capable of providing users with additional assistance, interaction, surveying capabilities, entertainment, and the like, all while enabling the user to perform other activities independently. This can improve a user's productivity and/or interactive capability. However, many such potential environments and usages are associated with high levels of stress and strain. Existing robotic ball devices do not possess sufficient durability to meet these demands, thereby limiting the usefulness of such devices in many potentially applicable environments and settings.

In addition, current designs and their associated weaknesses limit the types of additional features, equipment, and devices that can be utilized in conjunction with the robotic ball devices. For example, existing robotic ball devices do not include advanced or complex electronics that may be more fragile or delicate and would be easily damaged by normal operation of the robotic ball device. Robotic ball devices known in the art similarly exclude the use of components that could increase the interactive capability of such devices, as well as the variety of tasks capable of being performed by such devices. This limits the usefulness and versatility of known robotic ball devices in a wide variety of environments.

For instance, many known robotic ball devices are configured for autonomous control by utilizing interior drive system and/or control system for generating propulsion. In some instances, propulsion is generated by a motor coupled to an interior face of the exterior shell. The motor drives rotation of the shell by turning a rotor that is securely affixed to the interior face of the shell. In this manner, the robotic ball device is caused to roll. However, such robotic ball devices often fail over time, in part due to the presence of weak areas that are prone to breakage during operation. Some examples of such weak areas include connection points, e.g., between the rotor and the shell. Accordingly, these and prior art robotic ball devices are characterized by insufficient robustness and durability, thereby limiting the variety of environments in which they can be implemented and utilized.

SUMMARY

There is a need for a robotic ball device that possesses improved robustness and durability, and that is capable of remaining operable for a longer useable lifetime. Furthermore, there is a need for a robotic ball device capable of operating in a wider variety of environments and capable of being implemented for a wider variety of uses than is presently available. Finally, there is a need for a robotic ball device capable of supporting components having a higher degree of fragility, such as electronic components. The present invention is directed toward further solutions to address these and other needs, in addition to having other desirable characteristics that will be appreciated by one of skill in the art upon reading the present specification.

In accordance with one embodiment of the present invention, a robotic ball device having a center point and a first axis of rotation passing through the center point around which the robotic ball device rotates during motion in a forward linear direction can include a housing and a defined pathway located on an inner face of the housing that forms a closed loop around the first axis of rotation. A rolling member can be contained in the housing and movably disposed on the defined pathway. An actuator can be coupled to the rolling member for actuating rotation of the rolling member. A weighted component can be operationally coupled to the rolling member, and the weighted component can be sufficiently heavy to maintain the rolling member, during motion in the forward linear direction, at a substantially constant angular position in a forward vertical plane, which dissects the rolling member, relative to an origin in a moving frame of reference that moves with the robotic ball device. The rolling member can be vertically unaligned with the first axis of rotation.

In accordance with further embodiments of the present invention, the rolling member can be situated at a position defined by an angle away from a central vertical axis of the robotic ball device, wherein the angle is about 0 to 45°. The weighted component can be configured in such a way as to move to shift a center of gravity of the robotic ball device. The weighted component can be configured in such a way as to pivot around a second axis of rotation that is substantially perpendicular to the first axis of rotation. The weighted component can be configured in such a way as to move between a plurality of horizontally different positions. A second actuator can be included for actuating motion of the weighted component. The second actuator can include a servomotor or a rack and pinion system. The defined pathway can include a track, a tread, a gear having teeth, a recess for receiving the rolling member, a protruding annular band for being received by the rolling member, or a combination thereof. The rolling member can include any one or more of the following: a gear, a wheel, or a roller.

In accordance with further embodiments of the present invention, the support structure can be contained in the housing. The support structure can be coupled to the rolling member and the weighted component. One or more coupling pieces can be included in the robotic ball device. The support structure can include a horizontal portion that is rotatably coupled to the housing by the one or more coupling pieces. The one or more coupling pieces can be circumferentially aligned along the first axis of rotation. The support structure can include a vertical chassis extending across substantially all of a vertical cross section of an interior volume of interior space enclosed by the housing. One or more compartments can be coupled to the support structure for containing one or more energy sources. One or more compartments can be disposed in or fixedly coupled to the housing for containing one or more energy sources. An access door can be included in the housing. The access door can be configured to assume an open configuration and a closed configuration. The access door can provide access to one or more internal portions of the housing.

In accordance with further embodiments of the present invention, one or more additional rolling members can be rotatably disposed on the defined pathway. Each of the one or more additional rolling members can be operationally coupled to the weighted component. One or more additional defined pathways can be included in the robotic ball device, and each additional defined pathway can be formed on the inner face of the housing. Each additional defined pathway can form an additional closed loop around the first axis of rotation. One or more additional rolling members can be rotatably disposed on the one or more additional defined pathways.

In accordance with further embodiments of the present invention, the robotic ball device can include a support structure and one or more suspension mechanisms rotatably coupling the support structure to the housing. The one or more suspension mechanisms can include one or more spiral suspensions, one or more compressible portions, or both. The robotic ball device can include one or more suspension mechanisms that are coupled to and that support the rolling member. The one or more suspension mechanisms coupled to the rolling member can include one or more spiral suspensions, one or more compressible portions, or both.

In accordance with further embodiments of the present invention, the housing can include at least a portion forming a screen for displaying a projected display. A display system can be disposed inside the housing. The display system can include any one or more of the following: a projection unit, a flat display, and a lens. One or more cameras can be disposed inside the housing. One or more capacitive sensors can be disposed inside the housing. A processor can be disposed inside the housing, a computer readable storage medium inside the housing, or both. A communications device for communicating with a wireless device to transmit data, receive data, or both. A support structure can be coupled to the weighted component and the rolling member, and one or more rotatable elements can rotatably couple the weighted component to the support structure. The one or more rotatable elements can enable spinning motion of the weighted component.

In accordance with further embodiments of the present invention, the rolling member can be disposed in an upper portion or a lower portion of the robotic ball device. The weighted component can include the rolling member. The rolling member can rotate around a second axis of rotation that is different from the first axis of rotation. The robotic ball device can include a support structure that is coupled to the rolling member, the weighted component, and the actuator. A first gear having a first diameter can be coupled to the support structure and the actuator. A second gear having a second diameter can be coupled to the first gear. A third gear having a third diameter can be coupled to the second gear. A fourth gear having a fourth diameter can be coupled to the third gear. At least two of the first diameter, the second diameter, the third diameter, and the fourth diameter can be unequal. Exactly three of the first diameter, the second diameter, the third diameter, and the fourth diameter can be equal.

In accordance with another embodiment of the present invention, a robotic ball device having a center point and a first axis of rotation passing through the center point around which the robotic ball device rotates during motion in a forward linear direction can include a housing and a defined pathway located on an inner face of the housing that forms a closed loop around the first axis of rotation. At least two rolling members can be contained in the housing and movably disposed on the defined pathway. An actuator can be coupled to at least one of the at least two rolling members for actuating rotation of the at least two rolling members. A weighted component can be operationally coupled to at least one of the at least two rolling members. For any rolling member of the at least two rolling members, and during motion in the forward linear direction, the any rolling member can remain at a substantially constant angular position in a forward vertical plane, which dissects the any rolling member, relative to an origin in a moving frame of reference that moves with the robotic ball device. Each of the at least two rolling members can be vertically unaligned with the first axis of rotation.

In accordance with yet another embodiment of the present invention, a robotic ball device can include a housing, a car movably disposed on an inner face of the housing, the car comprising a body and one or more rolling members, and one or more capacitive sensors coupled to the car.

In accordance with further embodiments of the present invention, the robotic ball device additionally can include any one or more of the following: a voltage source, a communications device, a processor, and a machine readable storage medium. The robotic ball device additionally can include any one or more of the following: voltage source, a processor, and a machine readable storage medium. Instructions can be stored on the machine readable storage medium, and the instructions can cause a change in a sensitivity of at least one of the one or more capacitive sensors when executed by the processor. A voltage source, a processor, and a communications device can be included in the robotic ball device. The communications device can be coupled to the processor, and further the communications device can be configured to receive one or more signals that cause the processor to change a sensitivity of at least one of the one or more capacitive sensors. The one or more capacitive sensors can be supplied by a voltage source having a voltage level sufficient to cause the one or more capacitive sensors to detect human contact with the housing.

In accordance with still another embodiment of the present invention, a robotic ball device can include a housing, one or more capacitive sensors, and a voltage source coupled to the one or more capacitive sensors. The voltage source can be configured to supply a voltage level that is sufficient to cause the one or more capacitive sensors to detect human contact with the housing. The one or more capacitive sensors can be coupled to the housing. The robotic ball device further can include a support structure coupled to an inner face of the housing, and the one or more capacitive sensors can be coupled to the support structure.

BRIEF DESCRIPTION OF THE FIGURES

These and other characteristics of the present invention will be more fully understood by reference to the following detailed description in conjunction with the attached drawings, in which.

DETAILED DESCRIPTION

Figure 1A:
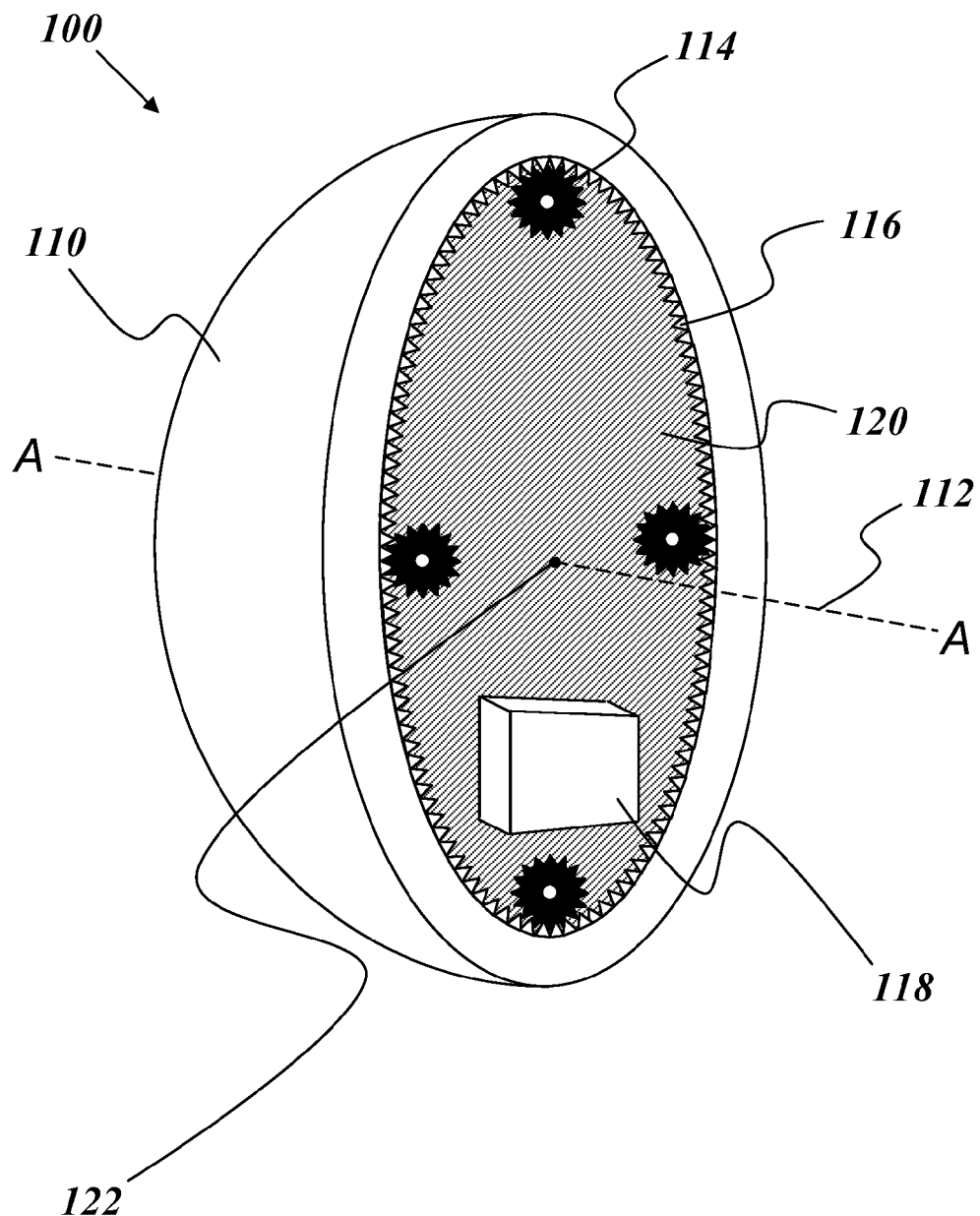
FIG. 1A is a cross-sectional perspective view of an example robotic ball device, according to one embodiment of the present invention.

An illustrative embodiment of the present invention relates to a robotic ball device. The robotic ball device can be capable of at least forward and backward linear motion. During forward or backward linear motion, the robotic ball device rotates around a first axis of rotation. The robotic ball device includes a housing and a defined pathway located on an inner face of the housing. For example, the defined pathway can be a track, a tooth set, a tread, a protruding annular band, a recess, or any other defined pathway. The robot ball device includes at least one rolling member that is contained internal to the housing and movably disposed on the defined pathway. The rolling member is coupled (e.g., operationally) to an actuator, such as a motor. The robotic ball device further can include a weighted component.

The robot ball device is propelled forward or backward by actuated rotation of the rolling member. During steady state motion (e.g., constant velocity) in a forward linear direction, the robotic ball device is in a moving frame of reference. During such steady state motion in a forward linear direction, each rolling member can be configured in such a way as to remain at a substantially constant angular position in a forward vertical plane dissecting the rolling member relative to an origin in the moving frame of reference. For example, the origin can be the center point of the robotic ball device. In some embodiments, the feature of the rolling member remaining at a substantially constant angular position in the forward vertical plane relative to the origin in the moving frame of reference (e.g., the center point) is attributable to the weighted component, e.g., attributable to the weight and/or position of the weighted component. For example, the weighted component can be sufficiently heavy and/or sufficiently positioned to maintain each rolling member at substantially the same angular position relative to the origin (e.g., the center point of the robotic ball device) in the forward vertical plane dissecting the rolling member as the robotic ball device passes through a plurality of different positions resulting from the steady state motion of the robotic ball device in the forward linear direction.

FIGS. 1A through 19, wherein like parts are designated by like reference numerals throughout, illustrate example embodiments of a robotic ball device, according to the present invention. Although the present invention will be described with reference to the example embodiments illustrated in the figures, it should be understood that many alternative forms can embody the present invention. One of skill in the art will additionally appreciate different ways to alter the parameters of the embodiments disclosed, such as the size, shape, or type of elements or materials, in a manner still keeping with the spirit and scope of the present invention.

Figure 1B:
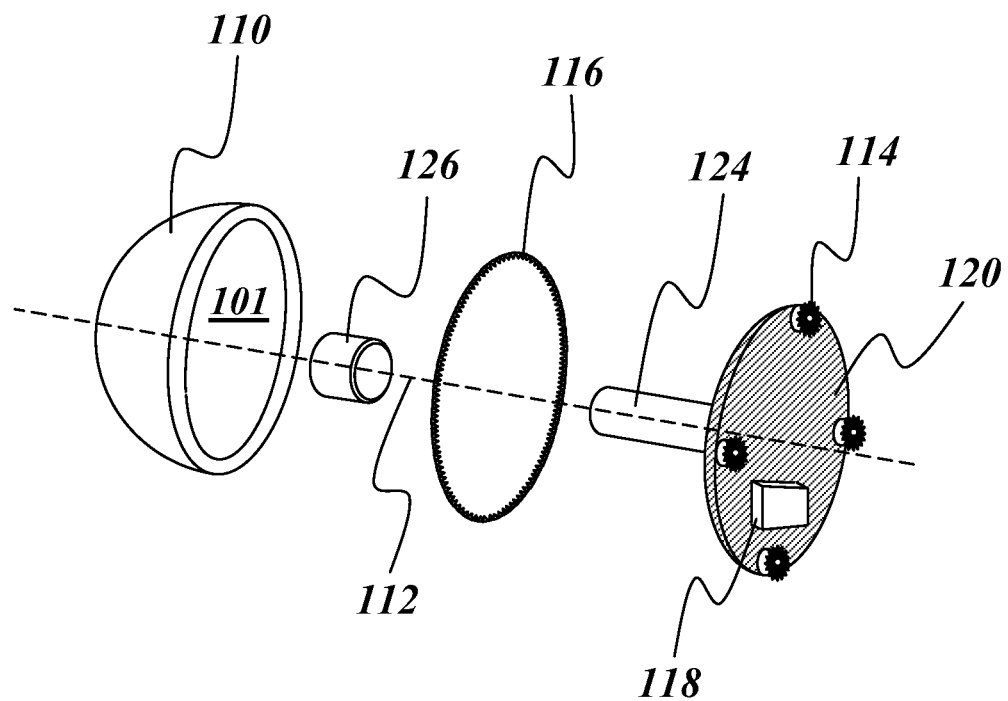
FIG. 1B is an exploded view of the robotic ball device of FIG. 1A, according to aspects of the present invention.

FIG. 1A depicts a perspective view of an open half of a robotic ball device 100. FIG. 1B further depicts the open half of the robotic ball device 100 of FIG. 1A from an exploded perspective view. The robotic ball device 100 includes a housing 110 that encloses a volume of interior space 101. In illustrative embodiments, the housing 110 is generally spherically shaped so as to promote steady and smooth rolling motion. However, other shapes are possible and may be desirable, e.g., given a particular type of terrain on which the robotic ball device 100 is intended to roll, and/or given other characteristics associated with particular intended applications or uses. Accordingly, the housing 110 can be shaped in a manner that is generally spherical, circular, egg-shaped, polygonal-shaped, oval-shaped, or otherwise shaped. The housing 110 can have sharp edges, rounded edges, multiple curvatures, undulations, flat surfaces, multiple inner and/or outer faces, and the like. Furthermore, the housing 110 can have outer grooves, scores, bumps, recesses, treads with tread patterns, or other exterior surface features or irregularities. Although FIGS. 1A through 1D depict the housing 110 as having only a single outer face and a single inner face both of which are both generally spherically shaped, it should be understood that other embodiments are possible. For example, the housing 110 can be shaped to enclose multiple discontinuous interior volumes of interior space. Furthermore, the outer face(s) and inner face(s) generally can assume other shapes besides the one depicted in FIGS. 1A through 1D, including shapes that are different from one another. The housing 110 can have any suitable thickness, and can be thin relative to the volume of interior space 101, or can occupy a significant portion of the overall volume of the robotic ball device 100.

Contained in the housing 110 are one or more rolling members 114. Specifically, in the example embodiment of FIGS. 1A and 1B, four rolling members 114 are included. The rolling members 114 generally can include wheels, rollers, gears, pinions, balls, any other rolling member, or combinations thereof, as would be appreciated by one of skill in the art. In the example embodiment of FIGS. 1A and 1B, the rolling members 114 are rotatable pinions. The rolling members 114 are movably disposed on a defined pathway 116. The defined pathway 116 is located on an inner face of the housing 110 and can be any pathway that is in some way defined, e.g., that is in some way structurally defined. As illustrative examples, the defined pathway 116 can be a track, a tread, a tooth set, protruding annular band, a recess, a gear, any other defined pathway, or a combination thereof. The defined pathway 116 may be formed integral with the housing 110, may be affixed to the housing 110 (e.g., using fastening members, adhesives, or any other suitable mechanism), or may be otherwise joined with the housing 110 in any suitably secure manner.

The robotic ball device 100 further can include a weighted component 118 contained within the volume of interior space 101. The weighted component 118 can be configured as a counterweight, as would be understood by one of skill in the art. In general, the weighted component 118 can be a weight, a battery, a processor, an actuator (or component thereof), sensors, projector equipment, a machine readable storage medium, or any other component to be included in the robotic ball device 100 that may contribute to the weight of the weighted component 118. The weighted component 118 can be coupled (e.g., operationally) to the rolling members 114. For example, in the illustrative embodiment of FIGS. 1A and 1B, the weighted component 118 and the rolling members 114 are operationally coupled by a support structure 120 that is included in the robotic ball device 100.

In such embodiments that include the support structure 120, the support structure 120 can be any suitable structure for coupling (e.g., operationally) the weighted component 118 and the rolling members 114. For example, the support structure 120 can be a vertical chassis, which can have one or more substantially flat surfaces that extend over all, most, or some of a vertical cross-section of the volume of interior space 101. In general, the support structure 120 can include beams, plates, and any other type of support structure, as would be appreciated by one of skill in the art. The example support structure 120 of FIGS. 1A and 1B is a vertical chassis made up of a vertically extending plate having two circularly shaped faces that extend substantially across an entire vertical cross section of the interior volume of interior space 101 enclosed by the housing 110. However, any suitable shape and/or type of support structure 120 can be included.

In the example embodiment depicted FIGS. 1A and 1B, the rolling members 114 can be rotatably coupled to the support structure 120 by one or more axles, shafts, or rods (not shown) on the rolling members 114. For example, the axles, shafts, or rods can be securely and rotatably disposed in bearings or bushings (not shown) that are fixedly coupled to the support structure 120. The weighted component 118 can be fixedly secured to the support structure 120 via fastening mechanisms (e.g., screws, nails, and any other fastening mechanisms) and/or adhesives. Alternatively, the weighted component 118 can be formed integral with the support structure 120, or can fit into an appropriately sized frame structure (not shown) that is formed integral with the support structure 120. Other manners of fixedly securing the weighted component 118 to the support structure 120 are possible and will appreciated by one of skill in the art upon reading the present specification.

The robotic ball device 100 can be configured at least for forward and/or backward linear motion across a surface, such as the ground. During motion in the forward or backward linear direction, the robotic ball device 100 is in a moving frame of reference. During such motion forward or backward linear motion, the robotic ball device 100 rotates around a first axis 112 of rotation. The first axis 112 of rotation pass through a center point 122 of the robotic ball device 100. During such steady state motion (e.g., constant velocity) in a forward or backward linear direction, each rolling member 114 can remain at a substantially constant angular position in a forward vertical plane (i.e., dissecting the rolling member 114) relative to an origin in the moving frame of reference of the robotic ball device 100.

In illustrative embodiments, the feature of the rolling members 114 being "held" in a fixed angular position is attributable to the position and/or weight of the weighted component 118. Specifically, the weighted component 118 can be sufficiently heavy and/or sufficiently positioned such that the weight of the weighted component 118 maintains each given rolling member 114 at a substantially constant angular position in a forward vertical plane (i.e., dissecting the given rolling member 114) relative to the origin (i.e., the center point 122 of the robotic ball device 100) during steady state motion (e.g., constant velocity). As one example, this effect of "anchoring" the relative position of the rolling members 114 can be achieved by requiring that the weighted component 118 is positioned in such a way that the center of gravity of all rolling members 114 (taken collectively) and the center of gravity of all other components of the robotic ball device 100 (e.g., the housing 110 and all components contained in the volume of interior space 101 enclosed by the housing 110) lie along a single vertical axis that passes through the center point 122 and is perpendicular to the first axis 112 of rotation.

As yet another example of a suitable constraint for achieving the effect of "anchoring" the angular position of the rolling members 114, a weight of the weighted component 118 can be required to be sufficiently heavy to at least slightly overcome forces that tend to promote rotation of the support structure 120. For instance, such forces that tend to promote rotation of the support structure 120 (e.g., during motion at a constant velocity and/or acceleration), can include frictional forces between the defined pathway 116 and the rolling members 114, frictional forces between the housing 110 and the ground, forces of momentum on the rolling members 114 acting on the rolling members 114 in response to a sudden change in velocity of the robotic ball device 100, etc.

One of skill in the art will appreciate other additional or alternative constraints for determining the position and/or weight of the weight component 118 in a manner that causes the rolling members 114 to remain in a substantially fixed angular position in a forward linear plane relative to the center point 122 during forward or backward linear motion. In addition, one of skill in the art will appreciate requirements for determining suitable positions and weights of other components of the robotic ball device 100. For example, the position and/or weight of one or more of the components included in the robotic ball device 100 can be constrained by requiring that the robotic ball device 100 (as a whole) possess a center of gravity that is situated in the bottom hemisphere and aligned along a central vertical axis of the robotic ball device 100 (i.e., a vertical axis passing through the center of the robotic ball device 100).

Such features and constraints on positions and weights of the components of the robotic ball device 100 can be utilized to configure the robotic ball device 100 for certain types or modes of operation. As one non-limiting example, providing the robotic ball device 100 with a center of gravity that is aligned along a central vertical axis of the robotic ball device 100 can enable the robotic ball device 100 to more stably move in a forward or backward linear direction.

It should be appreciated that such requirements and constraints described herein with respect to the example embodiment of FIGS. 1A and 1B need not be implemented in every embodiment. For example, it may be desirable in alternative embodiments to implement the robotic ball device 100 such that it travels in a circle upon being actuated. In such exemplary alternative embodiments, the robotic ball device 100 can be provided with a center of gravity that lies along a vertical axis (relative to an un-sloped ground) that does not pass through the center point 122.

Figure 1C:
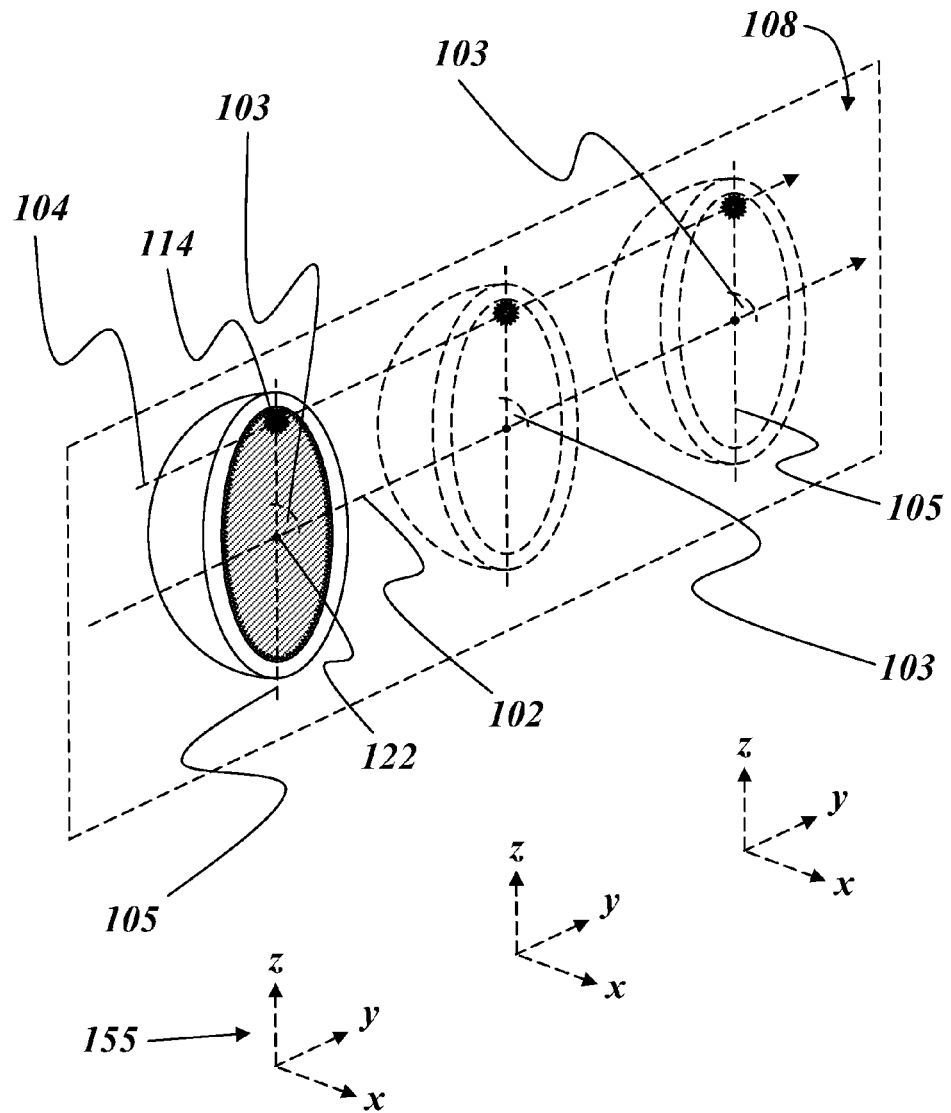
FIG. 1C is a diagrammatic illustration of cross-sections of the example robotic ball device of FIG. 1A in a succession of positions resulting from motion of the robotic ball device in a forward linear direction, according to aspects of the present invention.

FIG. 1C illustrates the feature of each given rolling member 114 remaining at a substantially constant angular position in a forward vertical plane (i.e., that dissects the given rolling member 114) relative to an origin in a moving frame of reference 155. For example, the origin in the moving frame of reference 155 can be the center point 122 of the robotic ball device 100. The moving frame of reference 155 moves with the robotic ball device 100, i.e., with the same velocity and direction of the robotic ball device 100. Accordingly, the moving frame of reference 155 is shown in three different positions, which correspond to the three positions in which the robotic ball device 100 is shown. For purposes of clarity, only one rolling member 114 is shown in FIG. 1C. As the robotic ball device 100 rolls in a forward linear direction 102, a forward linear path of motion 104 of the rolling member 114 is delineated. The forward linear path of motion 104 of the rolling member 114 is parallel to the forward linear direction 102 of the robotic ball device 100. A vertical axis 105 can be defined as an axis that is perpendicular to the forward linear direction 102 and on which the rolling member 114 is aligned.

In the embodiment of FIGS. 1A through 1D, the vertical axis 105 on which the rolling member 114 is aligned additionally passes through the center point 122 of the robotic ball device 100.

The vertical axis 105 and the forward linear path of motion 104 of the rolling member 114 define a forward vertical plane 108 dissecting the rolling member 114. Thus, the rolling member 114 remains aligned and positioned within the forward vertical plane 108 during steady state (e.g., constant velocity) motion of the robotic ball device 100 in the forward linear direction 102. As the robotic ball device 100 rolls and passes through a variety of different positions resulting from the steady state motion (e.g., constant forward velocity), the rolling member 114 remains "anchored" by the weighted component 118 (not depicted in FIG. 1C for clarity). In particular, the weight and/or position of the weighted component 118 can be at least partially responsible for the rolling member 114 remaining at a substantially constant angular position in the forward vertical plane 108 relative to the origin in the moving frame of reference 155.

As further depicted in FIG. 1C, the substantially constant angular position of the rolling member 114 within the forward vertical plane 108 can be defined by an angle 103 of displacement from the forward linear direction 102 relative to the origin (e.g., the center point 122 of the robotic ball device 100) in the moving frame of reference 155. During steady state motion of the robotic ball device 100 in the forward linear direction 102, the angle 103 remains substantially constant. Thus, in this manner, the angular position of the rolling member 114 in the forward vertical plane 108 relative to the origin (e.g., the center point 122 of the robotic ball device 100) in the moving frame of reference 155 remains substantially constant during such steady state motion in the forward linear direction 102.

Figure 1D:
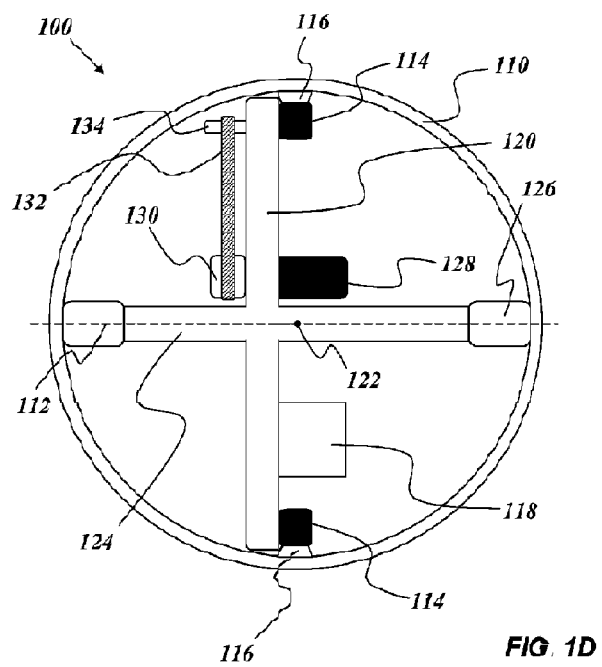
FIG. 1D is a cross-sectional view of the example robotic ball device of FIG. 1A depicted along line A-A, according to aspects of the present invention.

FIG. 1D illustrates the robotic ball device 100 of FIGS. 1A through 1C in greater detail. In particular, FIG. 1D depicts a vertical cross section of the robotic ball device 100 along the line A-A (see FIG. 1A). It should be noted that although the view of FIG. 1D illustrates a top portion and a bottom portion of the defined pathway 116 as seemingly discontinuous and unconnected, in reality the defined pathway 116 forms a closed loop around the first axis 112 of rotation, as clearly depicted by FIGS. 1A through 1C.

In the embodiment of FIG. 1D, the support structure 120 is slightly offset horizontally from the center point 122 of the robotic ball device 100, while the rolling members 114 are aligned horizontally with the center point 122 of the robotic ball device 100. The support structure 120 can include a horizontal portion 124, which can be rotatably coupled to the housing 110 by one or more coupling pieces 126, such as bearings, bushings, rolling members, and/or other coupling pieces configured to enable rotational motion of the housing 110 relative to the horizontal portion 124. Accordingly, during operation of the depicted embodiment of FIG. 1D, the housing 110 rotates around the horizontal portion 124. The horizontal portion 124 can be generally cylindrical shaped and can be circumferentially aligned along the first axis 112 of rotation. The horizontal portion 124 can be hollow or can be partially hollow, and/or can house one or more components to be included in the robotic ball device 100, e.g., batteries for supplying power to electrical components.

The robotic ball device 100 can include at least one of an actuator 128 for actuating rotational motion of the rolling members 114. In some embodiments, the actuator 128 is coupled to the rolling members 114 by being affixed or joined with one or more portions of the rolling members 114 (e.g., axles, shafts, rods, etc. on the rolling members 114). In other embodiments, the actuator 128 is coupled (e.g., operationally) to one or more additional components which together form an actuating system for translating motion of the actuator 128 into rotation of the rolling members 114. In general, many different actuators 128 and actuating systems are possible. For example, systems of gears, pulleys, and the like can be used to transfer the rotational motion of the actuator 128 into rotation by the rolling members 114. In one embodiment, the actuator 128 is implemented as a motor that includes a stator portion and a rotor portion, and spinning of the rotor portion causes the rolling member 114 to rotate.

Continuing with the example embodiment of in FIG. 1D, the actuator 128 is coupled to and configured to turn a first wheel 130. A belt 132 extends around the first wheel 130 and around an axle 134 on one of the rolling members 114. Accordingly, the belt 132 couples the first wheel 130 to the rolling member 114. The axle 134 can be mounted on the support structure 120, e.g., can pass through a bearing (not shown) in the support structure 120. Similarly, the first wheel 130 and the actuator 128 can be coupled by an axle, shaft, or rod (e.g., on the first wheel 130), etc. that passes through a bearing (not shown) in the support structure 120.

In illustrative embodiments where the robotic ball device 100 is configured at least for forward or backward motion in a straight line, it may be beneficial to include an actuating system and/or actuator 128 that enable placement of the actuator 128 in manner that satisfies one or more positioning and/or weight requirements. For example, the actuating system comprising the first wheel 130, belt 132, and axle 134 allows the actuator 128 to be placed on the right hand side (as depicted in FIG. 1D) of the support structure 120. This particular placement allows the weight of the actuator 128 to "balance" the weight of the support structure 120, thereby horizontally centering the center of gravity for the robotic ball device 100.

In general, the actuator 128 or actuating system can be configured to actuate just one of the rolling members 114, more than one of the rolling members 114, or all of the rolling members 114. In embodiments where the actuator 128 is physically coupled to or formed integral with one or more of the rolling member 114, any rolling members 114 that are not physically coupled to or formed integral with the actuator 128 will nonetheless be caused to rotate, due to each rolling member 114 being placed in contact with the defined pathway 116. Accordingly, the rotation of just one of the rolling members 114 while remaining in a substantially fixed angular position in the forward vertical plane 108 (not shown in FIG. 1D, for clarity) relative to the origin (e.g., the center point 122 of the robotic ball device 100) in the moving frame of reference 155 (not shown in FIG. 1D, for clarity) causes the housing 110 to rotate around the first axis 112 of rotation. In turn, rotation of the housing 110 causes all remaining rolling members 114 to rotate.

Figure 2:
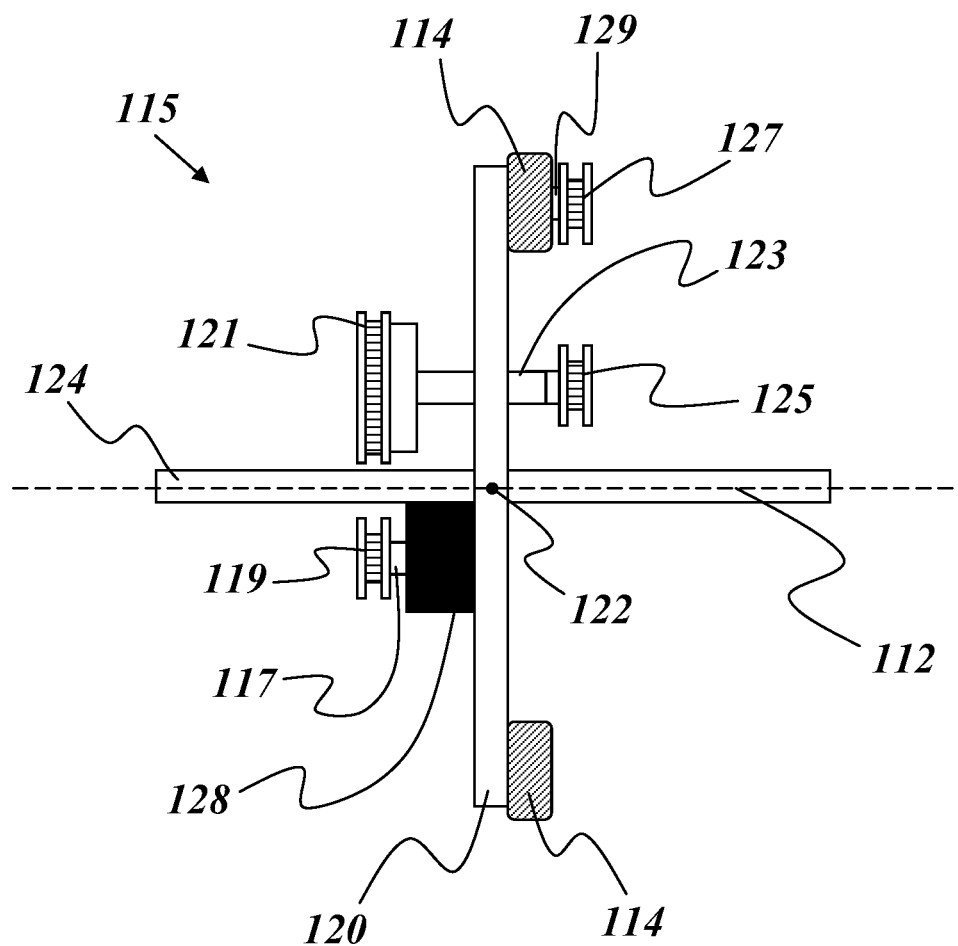
FIG. 2 is a diagrammatic illustration of an actuating system for actuating a rolling member contained in the robotic ball device, according to further aspects of the present invention.

FIG. 2 depicts one illustrative embodiment of an actuating system 115 for actuating rotational motion of one or more of the rolling members 114. The actuating system 115 includes the actuator 128. In an illustrative embodiment the actuator 128 includes a motor having a rotor portion and a stator portion. The rotor portion can be physically coupled to or formed integral with an axle 117 of a first gear 119. The first gear 119 can be coupled by a belt (not shown, for clarity) to a second gear 121. The second gear 121 can have a diameter that is different from a diameter of the first gear 119, thus causing the second gear 121 to rotate at a different angular velocity than that of the first gear 119 during operation. The second gear 121 can be fixedly coupled by an axle 123 to a third gear 125, such that the second gear 121 and the third gear 125 rotate at the same angular velocity during operation. The third gear 125 can be coupled by a belt (not shown, for clarity) to a fourth gear 127. The third gear 125 can have a diameter that is equal to a diameter of the fourth gear 127, such that the third gear 125 and the fourth gear 127 rotate at the same angular velocity during operation. In alternative embodiments, the third gear 125 and the fourth gear 127 have different diameters, such that they rotate at different angular velocities. The fourth gear 127 can be coupled by an axle 129 to the rolling member 114. In this manner, the actuator 128 (e.g., the rotor portion of the motor) is coupled to the rolling member 114 and rotates at an angular velocity that is different from an angular velocity of the rolling member 114.

Accordingly, the illustrative actuating system 115 of FIG. 2 converts the angular velocity of the rotor portion of the motor into a slower or faster angular velocity of the rolling member 114, as desired. This sort of actuating system 115 may be beneficial, for example, by providing a wider range of suitable actuating devices having different operational angular velocities in response to a particular supplied voltage. Furthermore, the actuating system 115 of FIG. 2 can improve efficiency of the robotic ball device 100 by alternatively providing the first gear 119 with a diameter that is greater than the diameter of the second gear 121, such that less power is required by the actuator 128 to generate a particular desired angular velocity of the rolling member 114.

Upon reading the present specification, one of skill in the art will appreciate a variety other different actuating systems for achieving similar effects, including (as non-limiting examples) actuating systems involving pulley systems, gear systems, or combinations thereof. Furthermore, it should be understood that the actuating system 115 of FIG. 2 is not included in all embodiments the present invention. For example, in some alternative embodiments, the actuator 128 is physically coupled or formed integral with an axle on the rolling member 114.

Figure 3A:
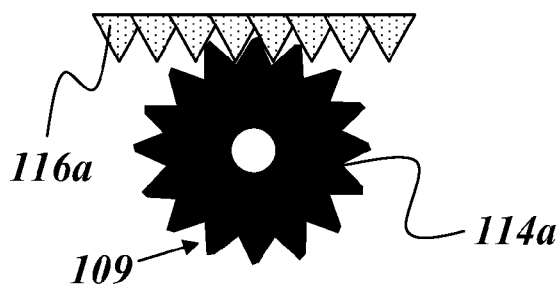
FIGS. 3A, 3B, 3C, and 3D are diagrammatic illustrations of example rolling members and corresponding defined pathways, according to aspects of the present invention.
Figure 3E:
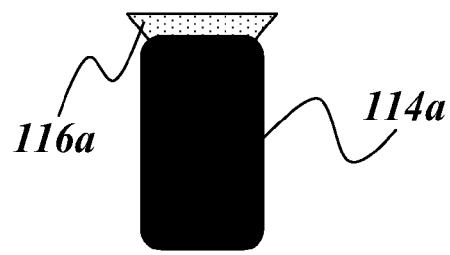
FIGS. 3E, 3F, 3G, and 3H are diagrammatic illustrations of the example rolling members and corresponding defined pathways of FIGS. 3A, 3B, 3C, and 3D, respectively, as shown from a cross sectional view, according to aspects of the present invention.
Figure 3B:
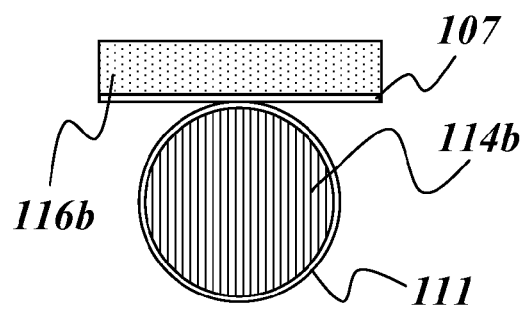
Figure 3F:
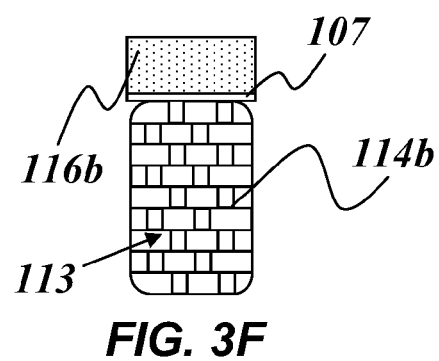
Figure 3C:
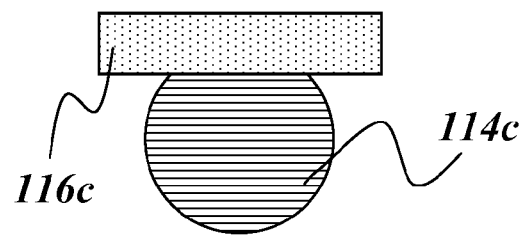
Figure 3G:
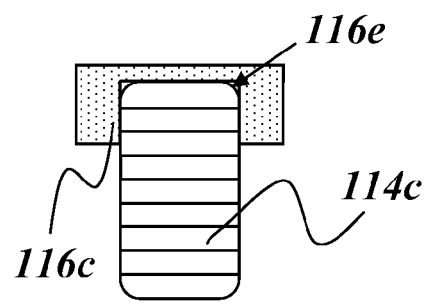
Figure 3D:
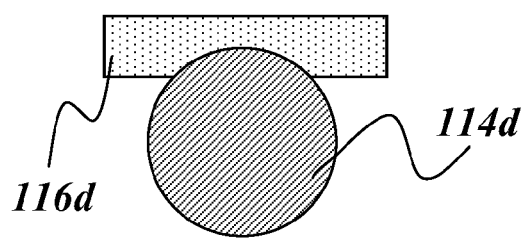
Figure 3H:
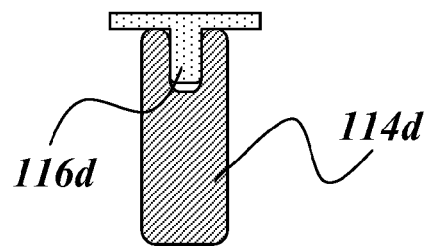

In particular, FIGS. 3A through 3D depict four example embodiments of a rolling member 114 and a corresponding defined pathway 116. FIGS. 3E through 3H depict the example rolling members 114 and corresponding defined pathways 116 of FIGS. 3A through 3D from a cross sectional view thereof. In particular, FIGS. 3A and 3E depict a gear 114a having a plurality of jutting gear teeth 109. The gear teeth 109 on the gear 114a are shaped and sized to fit into a corresponding tooth set 116a. FIGS. 3B and 3F depict a wheel 114b having an outer tread 111, such as a rubber tread. The tread 111 has a tread pattern 113, which can include any suitable pattern(s) for increasing traction between the wheel 114b and a corresponding track 116b. The track 116b additionally can have a tread 107, such as a rubber tread, for further improving traction. FIGS. 3C and 3G depict a wheel 114c configured to fit within and roll along a track 116c having a recess 116e. FIGS. 3D and 3H depict a roller 114d shaped and sized to fit around a protruding annular band 116d.

One of skill in the art will appreciate that the rolling members 114 of FIGS. 3A through 3H are illustrative and non-limiting. The present description contemplates a wide variety of other types and configurations of rolling members 114, which will be appreciated by one of skill in the art upon reading the present specification. For example, other mechanisms of configuring the pathway 116 and the rolling member 114 are possible, including as yet further non-limiting examples, magnetic and/or electrical features and characteristics.

Figure 4A:
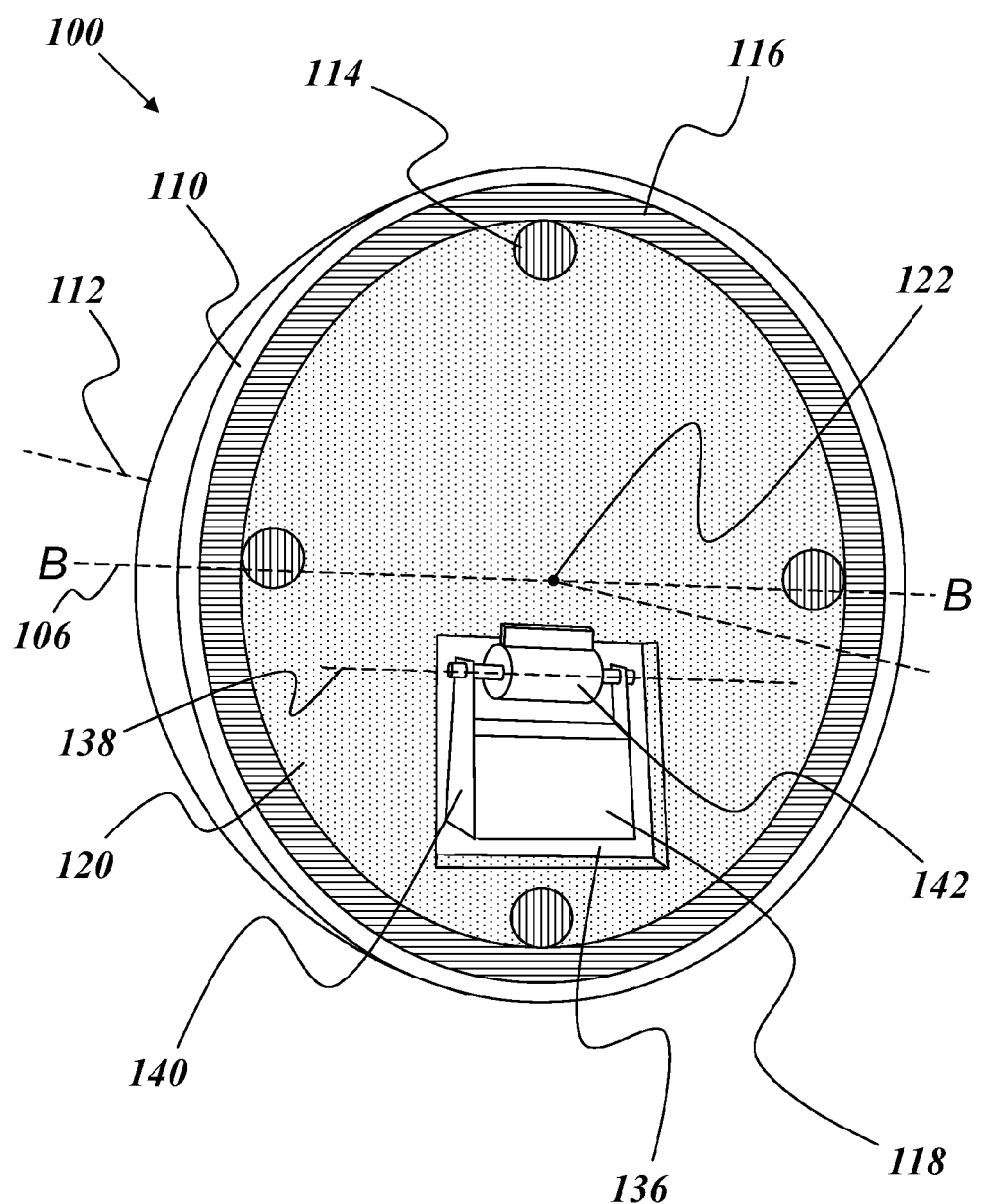
FIG. 4A is a cross-sectional perspective view of an example robotic ball device that additionally includes a movable weighted component, according to embodiments of the present invention.
Figure 4B:
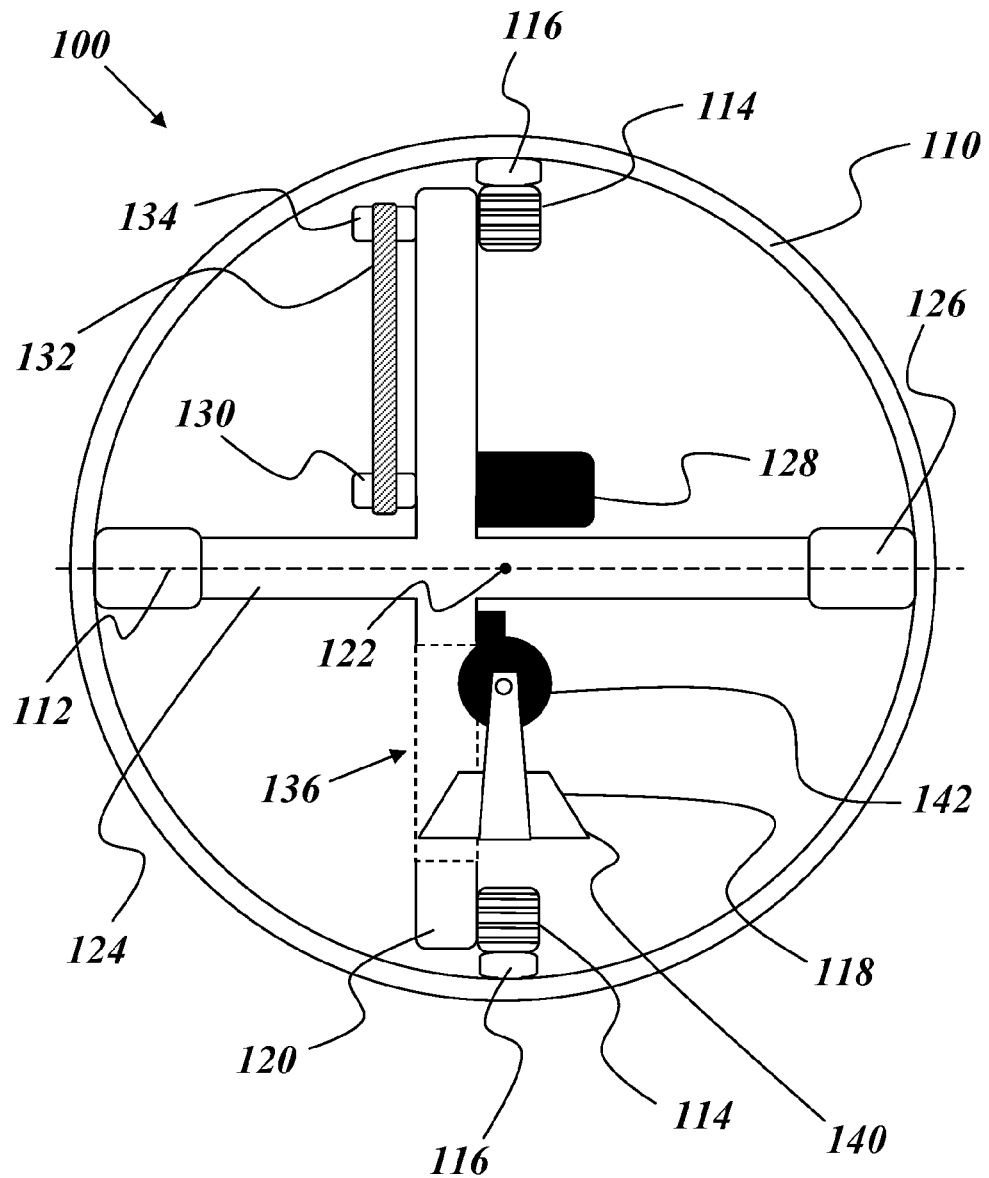
FIG. 4B is a cross-sectional view of the example robotic ball device of FIG. 4A, as depicted vertically along line B-B, according to aspects of the present invention.

FIGS. 4A and 4B depict an embodiment of the robotic ball device 100 that is further equipped with turning capability.

FIG. 4A illustrates the robotic ball device 100 from a cross-sectional perspective view. FIG. 4B further depicts the robotic ball device 100 from a vertical cross section view along line B-B. As shown, the robotic ball device 100 further includes an opening 136 disposed in and through an entire width of the support structure 120. In the example embodiment of FIG. 4A, the opening 136 is shaped and sized to allow a range of rotating or tilting motion by the weighted component 118 around a second axis 138 of rotation. In the example embodiment of FIG. 4A, the second axis 138 of rotation is perpendicular to the first axis 112 of rotation and does not lie in a common plane with the first axis 112 of rotation. However, in other embodiments, the first axis 112 of rotation and the second axis 138 of rotation lie in a common plane and/or are not perpendicular to one another.

In general, the opening 136 need not extend through an entire width of the support structure 120 in the manner depicted. Rather, the opening 136 can form a recess that extends into only a portion of a width of the support structure 120, while being sufficiently sized to enable a particular desired range of tilt or rotation of the weighted component 118. In yet other alternative embodiments, the opening 136 is an enclosed cavity that is contained entirely within the support structure 120. In such embodiments, the weighted component 118 can be entirely housed in the support structure 120, and the opening 136 can be sufficiently wide to enable a particular desired range of tilting or other motion by the weighted component 118 within the bounds of the support structure 120. Additionally, while the opening 136 is shown as having a perimeter that is surrounded on all sides by the support structure 120, it is entirely possible for the opening 136 to extend to an edge of the support structure 120 on one or more sides of the opening 136's perimeter. Many other embodiments of the opening 136 are possible and can be included in embodiments of the present invention.

In the example embodiment of FIG. 4A, the weighted component 118 is operationally and pivotally coupled to the support structure 120 and hangs over and/or into the opening 136. The weighted component 118 can be secured, coupled to, formed integral with, or otherwise joined with one or more frame members 140 that are rotatably or movably coupled to the support structure 120 (e.g., by axles and bearings, etc.). The robotic ball device 100 can further include an actuator 142 that is mounted on the support structure 120 (e.g., such that it hangs over the opening 136). The actuator 142 can be configured to control an angle at which the weighted component 118 is tilted, a position (e.g., a horizontal position) of the weighted component 118, an angular velocity at which the weighted component 118 is spinning, or another feature or position of the weighted component 118. For instance, in an illustrative embodiment, the actuator 142 is a motor, such as a servomotor, and the weighted component 118 and/or frame members 140 can be coupled to a shaft forming the rotor portion of the servomotor.

Figure 5A:
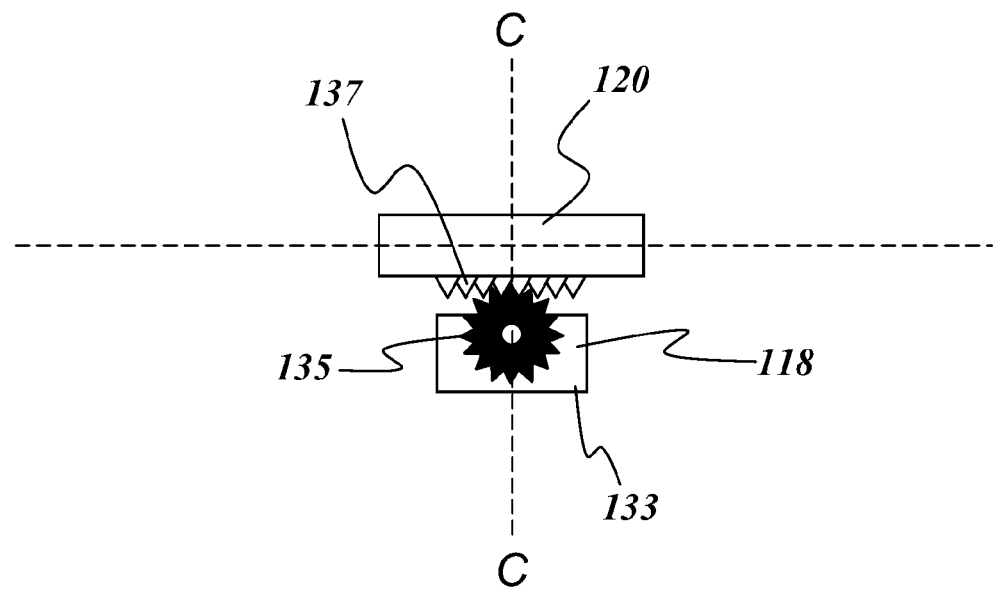
FIG. 5A is a diagrammatic illustration of an example rack and pinion system for enabling horizontal motion of a weighted component to shift a center of gravity of the robotic ball devices, according to example embodiments of the present invention.
Figure 5B:
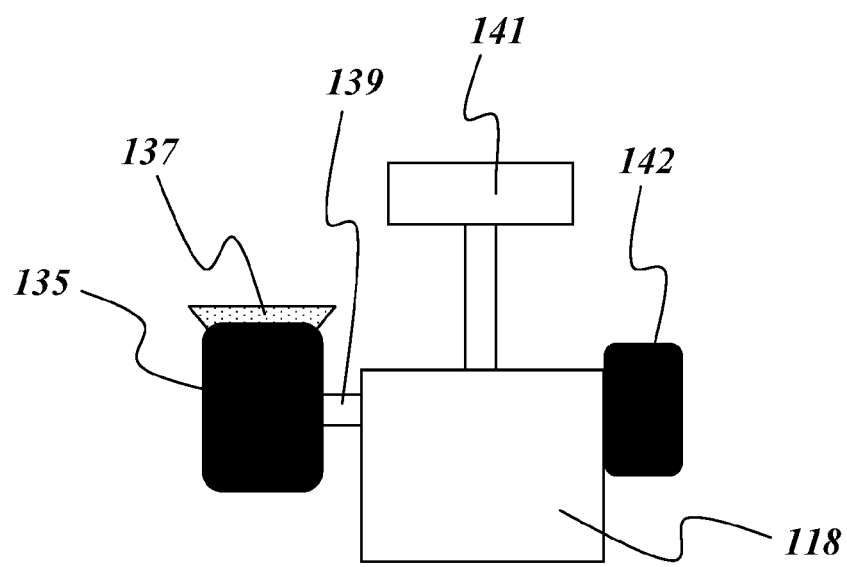
FIG. 5B is a diagrammatic illustration of the example rack and pinion system of FIG. 5A, as shown in a cross sectional view along line C-C.

Alternatively, the turning capability of the robotic ball device 100 can be enabled by different mechanisms. For example, the actuator 142 and the weighted component 118 can form a rack and pinion system that allows the weighted component 118 to assume any one of a plurality of different horizontal positions, between which the weighted component 118 can be moved, e.g., by the actuator 142. One such example is illustrated in FIG. 5A, which depicts an example rack and pinion system for adjusting the horizontal position of the weighted component 118. FIG. 5B further depicts the rack and pinion system of FIG. 5A from a side view along line C-C.

In particular, a rack 137 can be fixedly and non-movably coupled to the support structure 120. A pinion 135 can be rotatably coupled to the weighted component 118 and movably disposed on the rack 137. The actuator 142 can be coupled to the pinion 135 for actuating and controlling rotation of the pinion 135. For example, the actuator 142 can be a motor having a rotor portion, and the rotor portion can be coupled to, formed integral with, or otherwise joined with an axle 139 on the pinion 135. The axle 139 can pass through a bearing (not shown) in the weighted component 118. Accordingly, the actuator 142 can cause the pinion 135 to rotate, which can result in the pinion 135 moving horizontally along the rack 137, thereby changing the horizontal position of the weighted component 118. The change in the horizontal position of the weighted component 118 can allow the center of gravity of the robotic ball device 100 to shift, thus enabling turning capability. The weighted component 118 further can include a support piece 141 that fits in and passes through a recess in the support structure 120. The recess can extend in the direction of motion of the pinion 135 and can have a cross section that matches the shape of the support piece 141. Thus, protrusions on the support piece 141 can support the vertical position of the weighted component 118 while allowing the weighted component 118 to be moved in response rotation of the pinion 135.

Yet other alternatives for controlling the tilt, motion, and/or position of the weighted component will be appreciated by one of skill in the art upon reading the present specification. All such alternatives and embodiments are contemplated within the scope of the present invention.

Figure 4C:
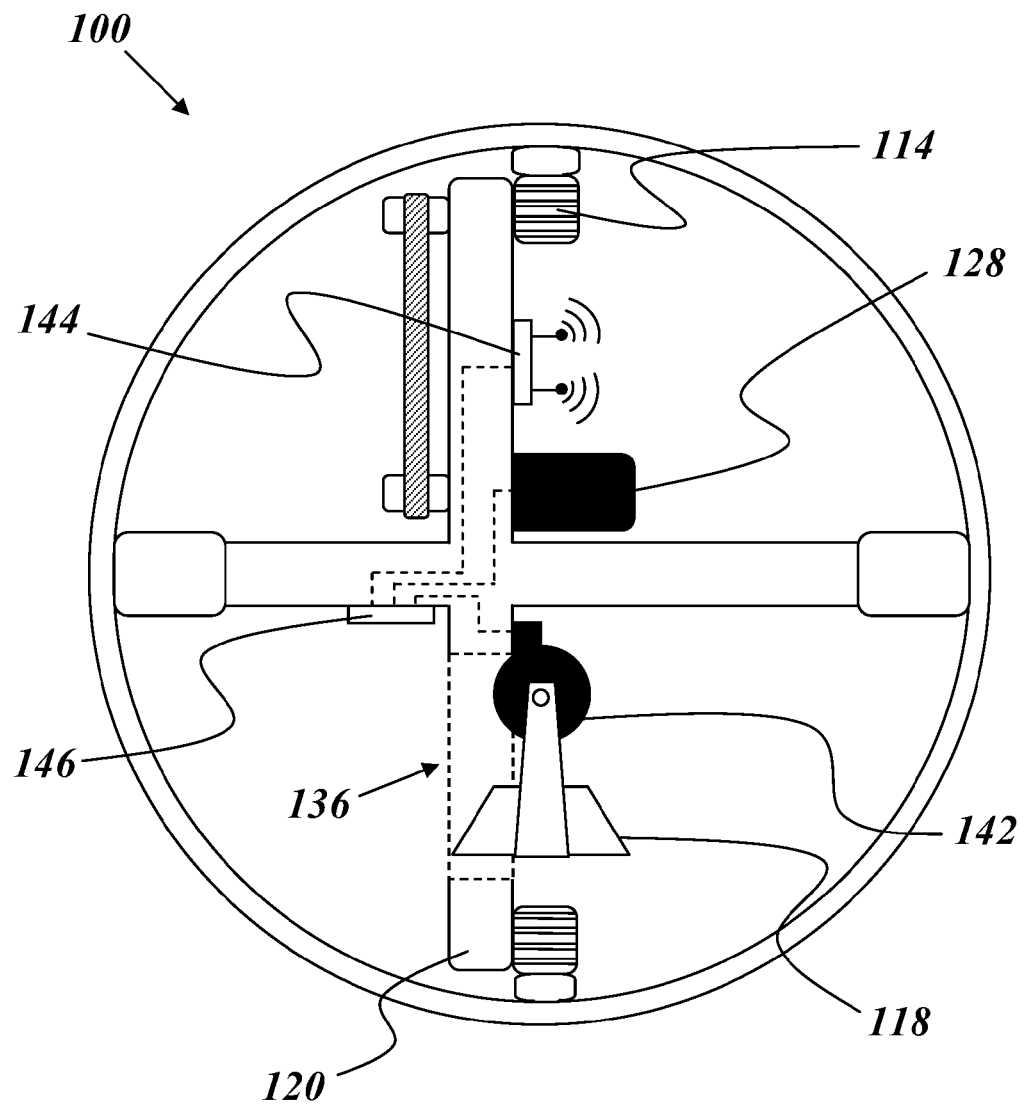
FIG. 4C is a cross-sectional view of the example robotic ball device as shown to in FIG. 4B, and additionally including remote control and/or communication capabilities, according to embodiments of the present invention.

Furthermore, while two separate actuators 128 and 142 are depicted in FIGS. 4B and 4C, one of skill in the art will appreciate alternative embodiments utilizing just a single actuator. For example, in some alternative embodiments, the actuators 128 and 142 are replaced by a motor having a clutch system for actuating and controlling both (1) rotational motion of one or more of the rolling members 114 and (2) tilt, rotation, and/or other motion of the weighted component 118.

Accordingly, tilting the weighted component 118, changing the horizontal position of the weighted component 118, and other suitable motion can cause the center of gravity of the robotic ball device 100 to shift. Such a shift can cause the center of gravity to be vertically offset from the center point 122 of the ball device with respect to the ground. In response, the robotic ball device 100 will begin to rotate around a third axis 106 of rotation (depicted in FIG. 4A) that passes through the center point 122 of the robotic ball device 100 and that is perpendicular to the first axis 112 of rotation. Accordingly, during forward or backward linear motion, this shift in the center of gravity of the robotic ball device 100 will cause the robotic ball device 100 to turn, i.e., to deviate from the linear direction of motion. The ability to shift the center of gravity thus endows the robotic ball device 100 with turning capabilities during motion in a forward or backward direction. For example, referring to FIG. 4B, as the robotic ball device 100 travels forward in a straight line into the page, tilting the weighted component 118 in a clockwise direction causes the robotic ball device 100 to deviate from the forward linear path and turn to the right.

The actuator 142 generally can be configured to maintain a constant tilt angle, a variable tilt angle, or a combination thereof. Furthermore, one of skill in the art will appreciate a variety of ways to enable the center of gravity of the robotic ball device 100 to be shifted to allow the robotic ball device 100 to rotate around the third axis 106 of rotation.

By providing some form of control over the tilt, horizontal position, etc. of the weighted component 118, the turning capability of the robotic ball device 100 can be controlled to provide steering capabilities. In embodiments where remote control is desired, one or more wireless devices, networking devices, global positioning systems (GPS), or the like can be included in the robotic ball device 100 for communicating wirelessly with a remote controller, a remote computer, a satellite (e.g., for GPS communication), or any other remote device.

For example, FIG. 4C depicts the robotic ball device 100 of FIGS. 4A and 4B further equipped for remote control. The robotic ball device 100 includes a communications device 144 logically coupled to a processor 146, which is logically coupled the actuators 128 and 142. The communications device 144 can be mounted to the support structure 120 (as shown), to the housing 110, or to any other suitable component of the robotic ball device 100. Signals received from the communications device 144 can cause the processor 146 to initiate, adjust, stop, etc. the actuators 128 and 142, thereby providing remote steering and motion control of the robotic ball device 100.

Alternatively or additionally to remotely controlling motion of the robotic ball device 100, the robotic ball device 100 can be provided with self-controlling and/or self-steering capabilities. In such self-controlling embodiments, one or more sensing mechanisms may be included in the robotic ball device 100 (shown later herein and described at least with reference to FIG. 11). For example, any one or more of the following mechanisms can be included, to allow the robotic ball device 100 to detect its relative or absolute position: capacitive sensors, cameras, heat sensors, ultrasonic sensors, echo-location sensors, communications devices such as satellite transceivers, GPS, and any other suitable mechanism for sensing a location, height, altitude, slope, velocity, acceleration, absolute or relative position, and the like, of the robotic ball device 100. Such mechanisms can be configured to communicate with one or more processors (such as the processor 146) and with the actuators 128 and 142 to provide control (e.g., using feedback mechanisms) over the motion of the robotic ball device 100.

Figure 6A:
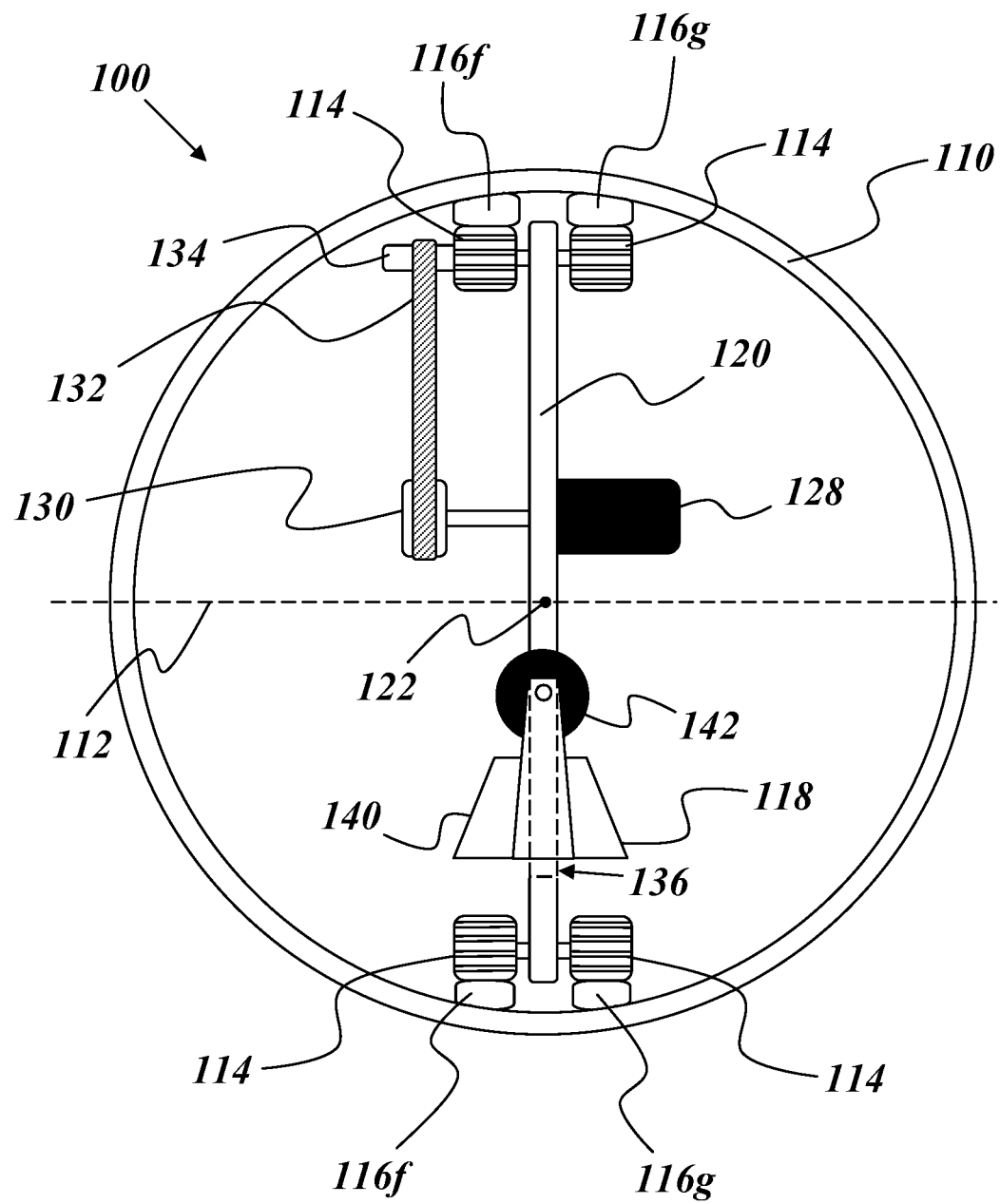
FIG. 6A is a cross-sectional view of an example robotic ball device having two defined pathways, according to embodiments of the present invention.

In general, multiple defined pathways 116 can be included in the robotic ball device 100. The multiple defined pathways can be formed on a single inner face of the housing 110, or on multiple different inner faces when the housing 110 is shaped to have more than one volume of interior space. For example, FIG. 6A depicts an alternative embodiment of the robotic ball device 100 having a first defined pathway 116$f$ and a second defined pathway 116$g$, which are both located on the same inner face of the housing 110 and which both form a closed loop around the first axis 112 of rotation. In the example embodiment of FIG. 6A, the first defined pathway 116$f$ is spaced a distance away from the vertical center of the robotic ball device 100 that is equal to a distance at which the second defined pathway 116$g$ is spaced away from the vertical center of the robotic ball device 100. However, in other embodiments, the first defined pathway 116$f$ and second defined pathway 116$g$ can be situated at other positions that are not equidistant from the vertical center the robotic ball device 100.

In the embodiment of FIG. 6A, the weighted component 118 is configured to be horizontally aligned with the center point 122 of the robotic ball device 100. Alternatively, the weighted component 118 can be horizontally displaced from the vertical center of the robotic ball device 100, e.g., in order to provide an appropriate balance of the various gravitational forces acting on the robotic ball device 100. In the embodiment of FIG. 6A, the actuator 142 is mounted to inner walls of the support structure 120 formed by the opening 136.

When multiple defined pathways are provided (e.g., the first defined pathway 116f and the second defined pathway 116g), rolling members 114 that are not disposed on the same defined pathway can be vertically aligned by being placed at substantially the same angular position along their respective defined pathways, e.g., to form vertically aligned pairs, triplets, etc. Furthermore, the "adjacent" rolling members 114 of such vertically aligned pairs, triplets, etc. can be coupled by a common axle, such as the axle 134. Accordingly, in such embodiments, the belt 132 is coupled to multiple rolling members 114, thereby allowing the actuator 128 to actuate multiple rolling members 114 simultaneously.

Figure 6B:
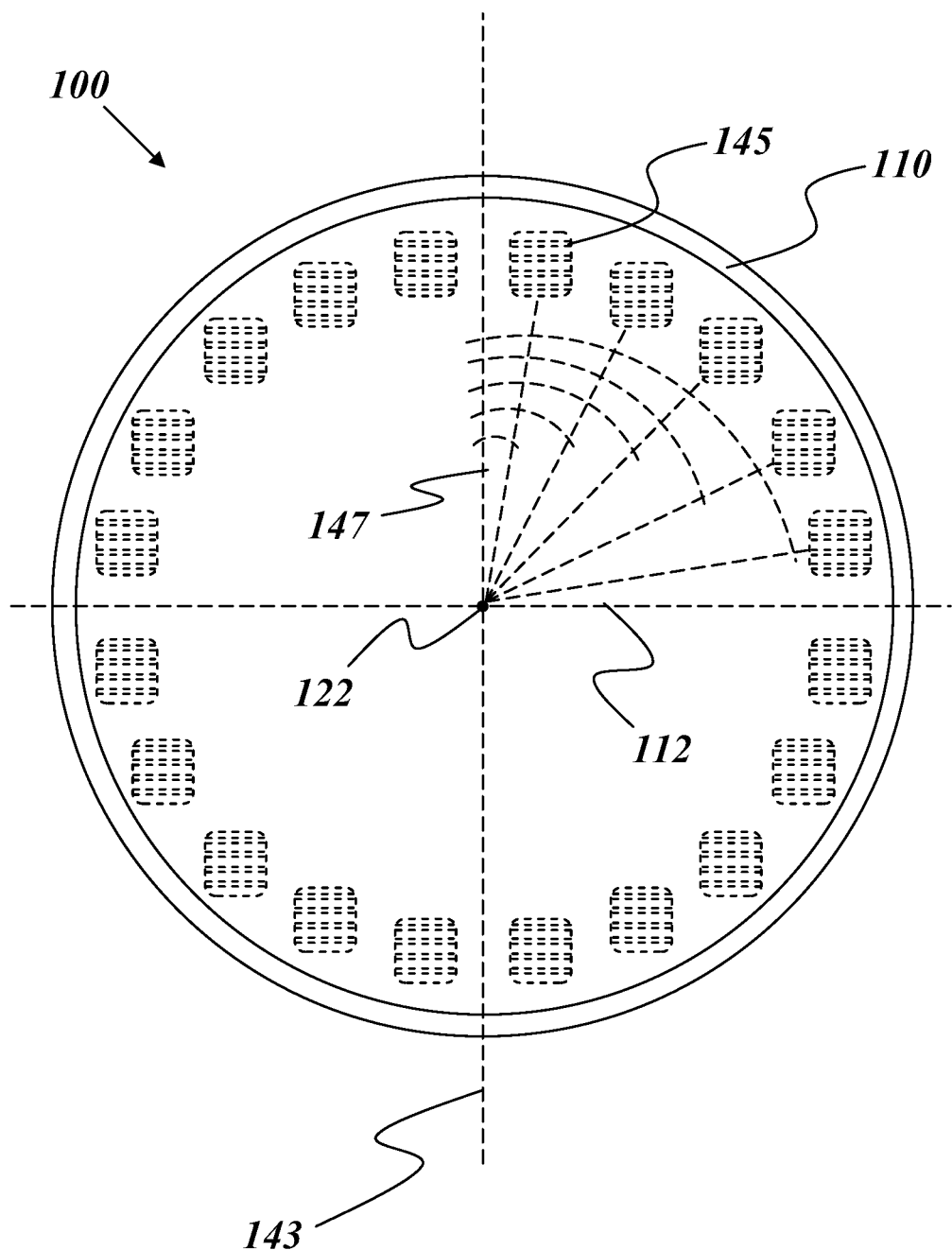
FIG. 6B is a diagrammatic illustration of a plurality of example positions at which the rolling members can be placed, according to aspects of the present invention.

In FIG. 6A, each of the rolling members 114 are situated at a position that can be defined by an angle away from a central vertical axis of the robotic ball device 100. For instance, FIG. 6B, depicts a plurality of example positions 145 at which the rolling members 114 generally can be situated. Each of the example positions 145 can be defined by an angle 147 away from a central vertical axis 143 of the robotic ball device 100. In general, the angle 147 can be any suitable angle. For example, for each rolling member 114, the angle 147 can be about 0°, 5°, 10°, 15°, 20°, 25°, 30°, 35°, 40°, 45°, 50°, 55°, 60°, 65°, 70°, 75°, 80°, 85°, 90°, 95°, 100°, 105°, 110°, 115°, 120°, 125°, 130°, 135°, 140°, 145°, 150°, 155°, 160°, 165°, 175°, 180°, or any angle falling therebetween. The angle 147 can be measured in any direction away from the central vertical axis 143. In illustrative embodiments, the rolling member 114 is vertically unaligned with the first axis 112 of rotation and the center point 122 of the robotic ball device 100. Said differently, in illustrative embodiments, the rolling member 114 is positioned such that its center does not lie along the first axis 112 of rotation, and such that the rolling member 114 rotates around an axis of rotation that is different from the first axis 112 of rotation.

Figure 7A:
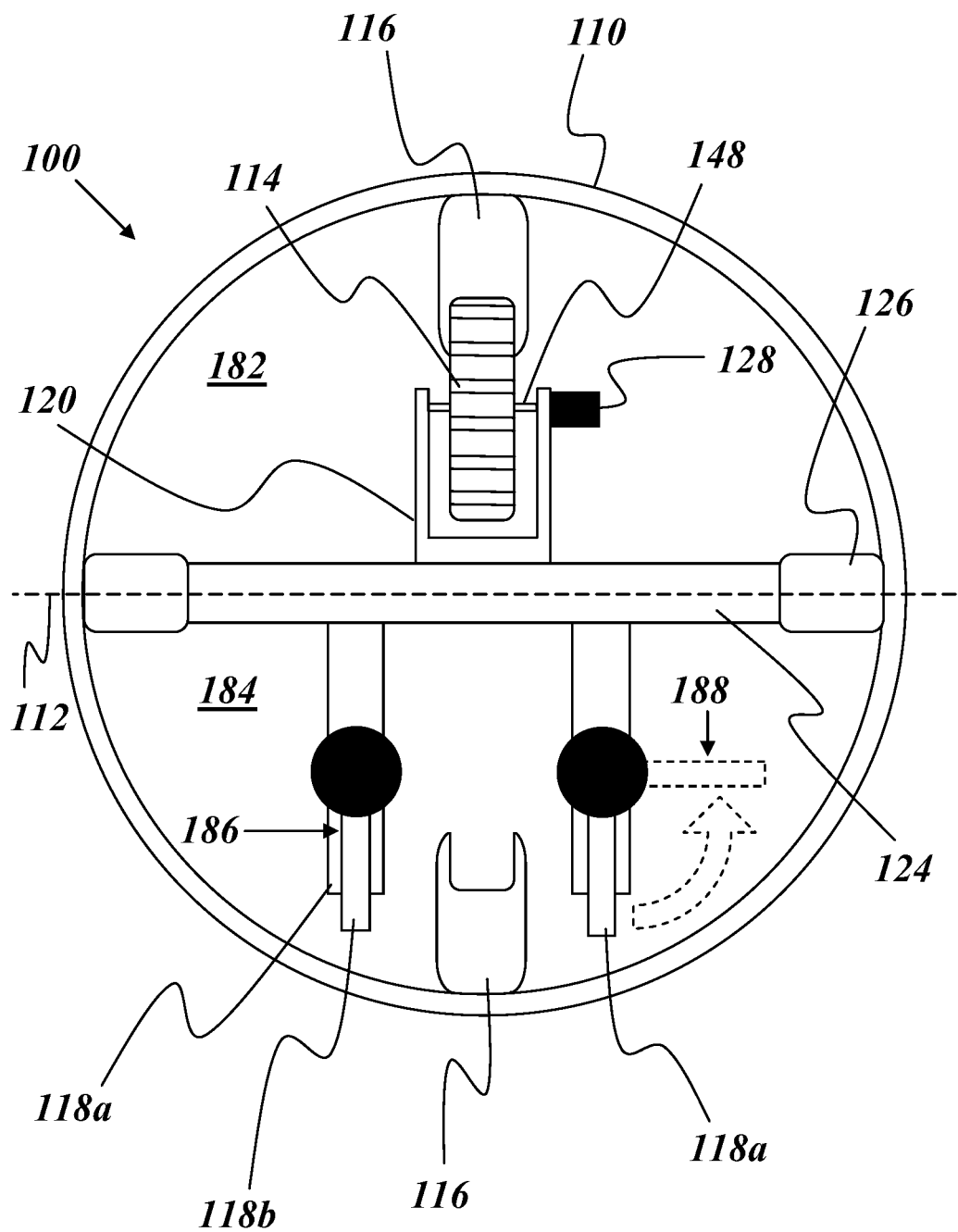
FIG. 7A is a cross-sectional view of an example robotic ball device having a rolling member disposed in a top portion thereof, according to embodiments of the present invention.

As yet a further alternative, it is possible to include only one rolling member 114. For example, FIG. 7A depicts an embodiment of the robotic ball device 100 according to the present invention including just a single rolling member 114 positioned in an upper portion 182 (e.g., a top hemisphere or a top half) of the robotic ball device 100. In the example embodiment of FIG. 7A, the defined pathway 116 is a track that protrudes from the inner surface of the housing 110. The robotic ball device 100 includes the support structure 120, which includes the horizontal portion 124. The horizontal portion 124 is rotatably coupled to the housing 110 by the one or more coupling pieces 126. The horizontal portion 124 further is coupled to the housing 110 at one or more points that are collectively centered along the first axis 112 of rotation.

The rolling member 114 can be rotatably coupled to the support structure 120, e.g., by the actuator 128 (such as a motor), a shaft 148, and one or more bearings or bushings (not shown). Two or more weighted components 118a can be coupled to or otherwise joined with the support structure 120 and situated in a bottom portion 184 (e.g., a bottom hemisphere or a bottom half) of the robotic ball device 100. While the two weighted components 118a are not specifically depicted as pivotally coupled to the support structure 120, one of skill in the art will appreciate a number of ways to modify and alter the example embodiment of FIG. 7A so as to provide the weighted components 118a with pivot capability.

Furthermore, additional weighted components 118b can be pivotally or movably coupled to one, some, or all of the weighted components 118a, as depicted in FIG. 7A. The weighted components 118b can be configured to rotate independently of one another or in synchronization with one another. Each of the weighted components 118b can be configured to assume a plurality of different positions such as vertical position 186 and horizontal position 188, which can be achieved by rotating or pivoting the weighted components 118b. The different positions of the weighted components 118b can be used to shift the center of gravity of the robotic ball device 100, thereby providing the robotic ball device 100 with turning capability.

Figure 7B:
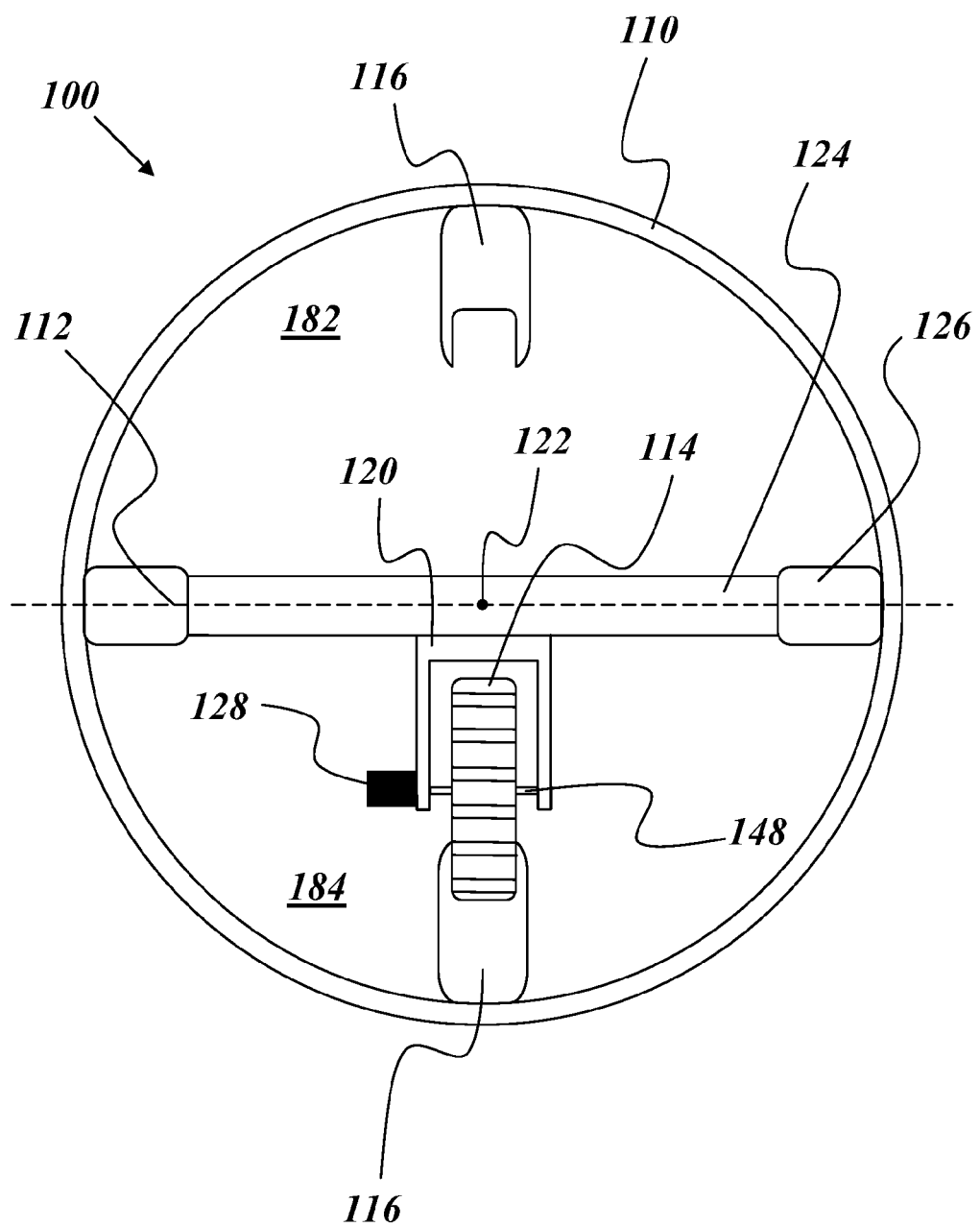
FIG. 7B is a cross-sectional view of an example robotic ball device having a rolling member disposed in a bottom portion thereof, according to embodiments of the present invention.

As yet a further alternative, the robotic ball device 100 can include a single rolling member 114 situated in the bottom portion 184 (e.g., the bottom hemisphere or the bottom half) of the robotic ball device 100. One such example embodiment of the robotic ball device 100 is depicted in FIG. 7B. In such embodiments where the robotic ball device 100 includes just one rolling member 114 disposed in the bottom portion 184 (e.g., the bottom hemisphere or the bottom half) of the robotic ball device 100, the rolling member 114 itself may serve as the weighted component 118. For example, the rolling member 114 can have a weight sufficient to maintain itself at a substantially constant angular position in the forward vertical plane 108 (not shown, for clarity) relative to the origin (e.g., the center point 122 of the robotic ball device 100) in the moving frame of reference 155 (not shown, for clarity) during steady state motion of the robotic ball device 100 in the forward linear direction 102 (not shown, for clarity). In such embodiments, the robotic ball device 100 includes a rolling member 114 and a weighted component, wherein the weighted component is the rolling member 114.

Figure 7C:
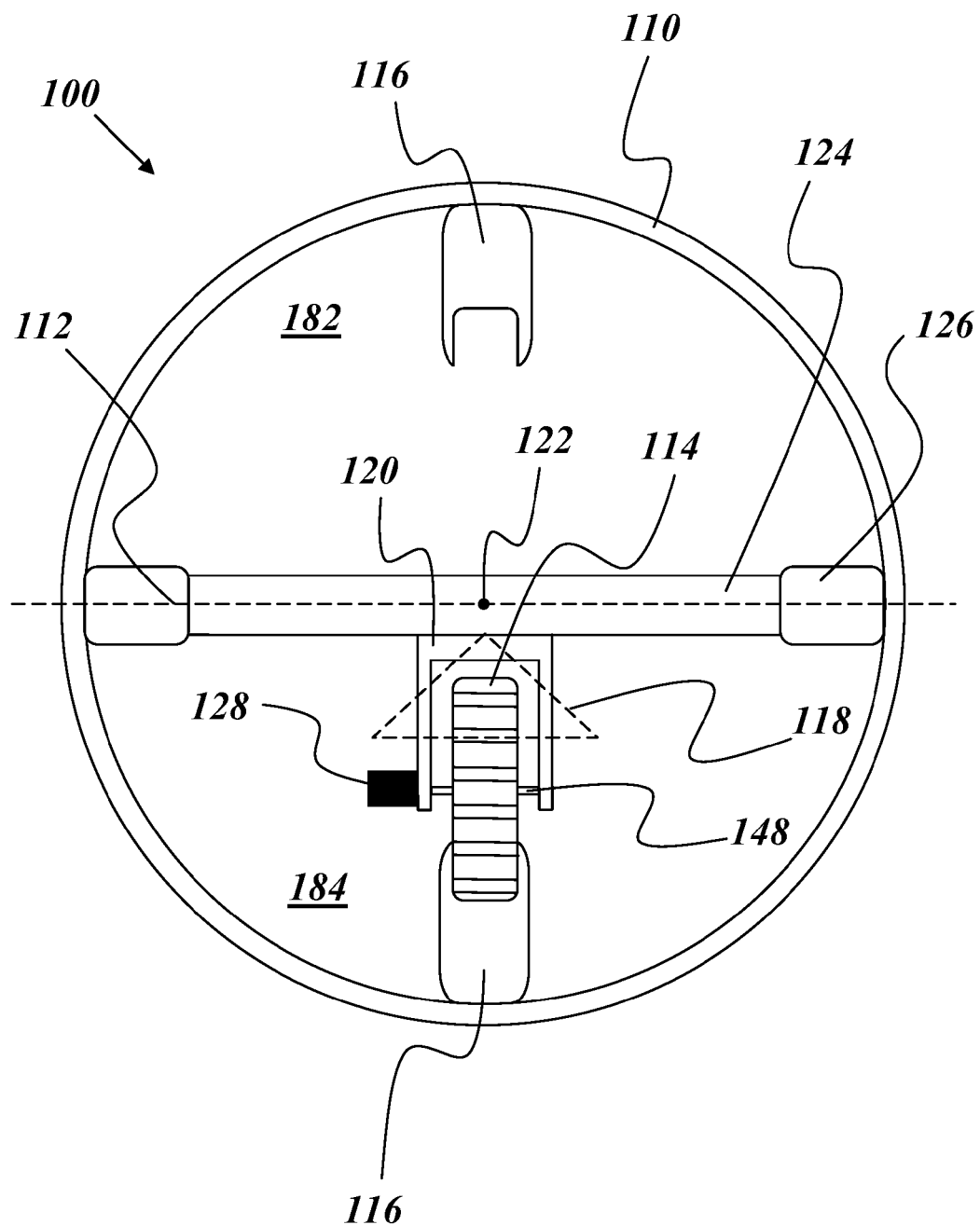
FIG. 7C is a cross-sectional view of the example robotic ball device of FIG. 7B, further including a weighted component positioned in front of or behind the rolling member, according to embodiments of the present invention.
Figure 7D:
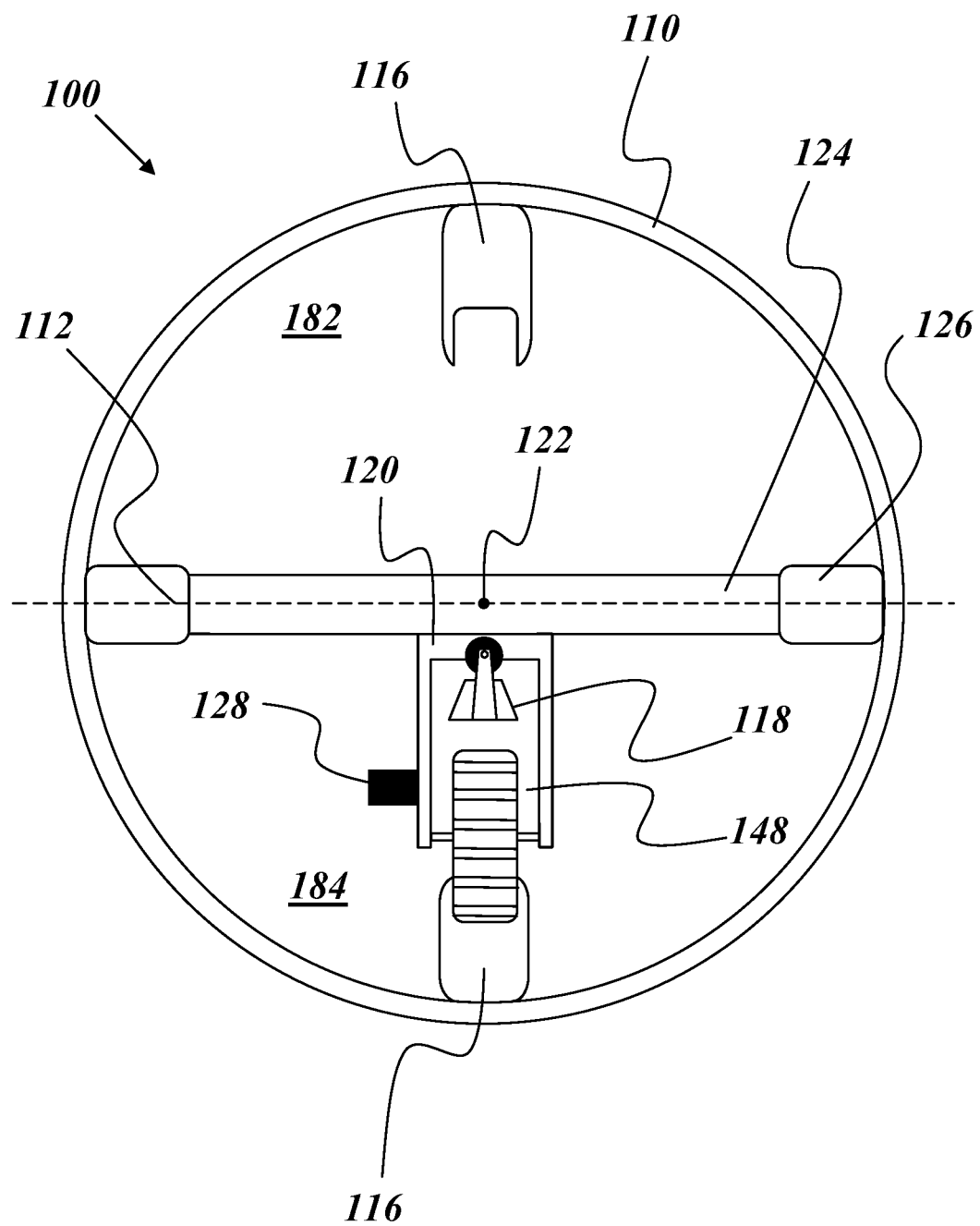
FIG. 7D is a cross-section view of the example robotic ball device of FIG. 7B, further including a weighted component positioned above the rolling member, according to embodiments of the present invention.

Furthermore, additionally or alternatively to the rolling member 114 serving as a weighted component, the robotic ball device 100 of FIG. 7B can include a separate weighted component 118. For example, FIG. 7C depicts one embodiment where the weighted component 118 is coupled (e.g., movably, pivotally, etc.) to the support structure 120, for instance, at a position on the horizontal portion 124 in front of or behind the rolling member 114. Alternatively, the weighted component 118 can be positioned above the rolling member 114, as depicted in the example embodiment of FIG. 7D.

Figure 8A:
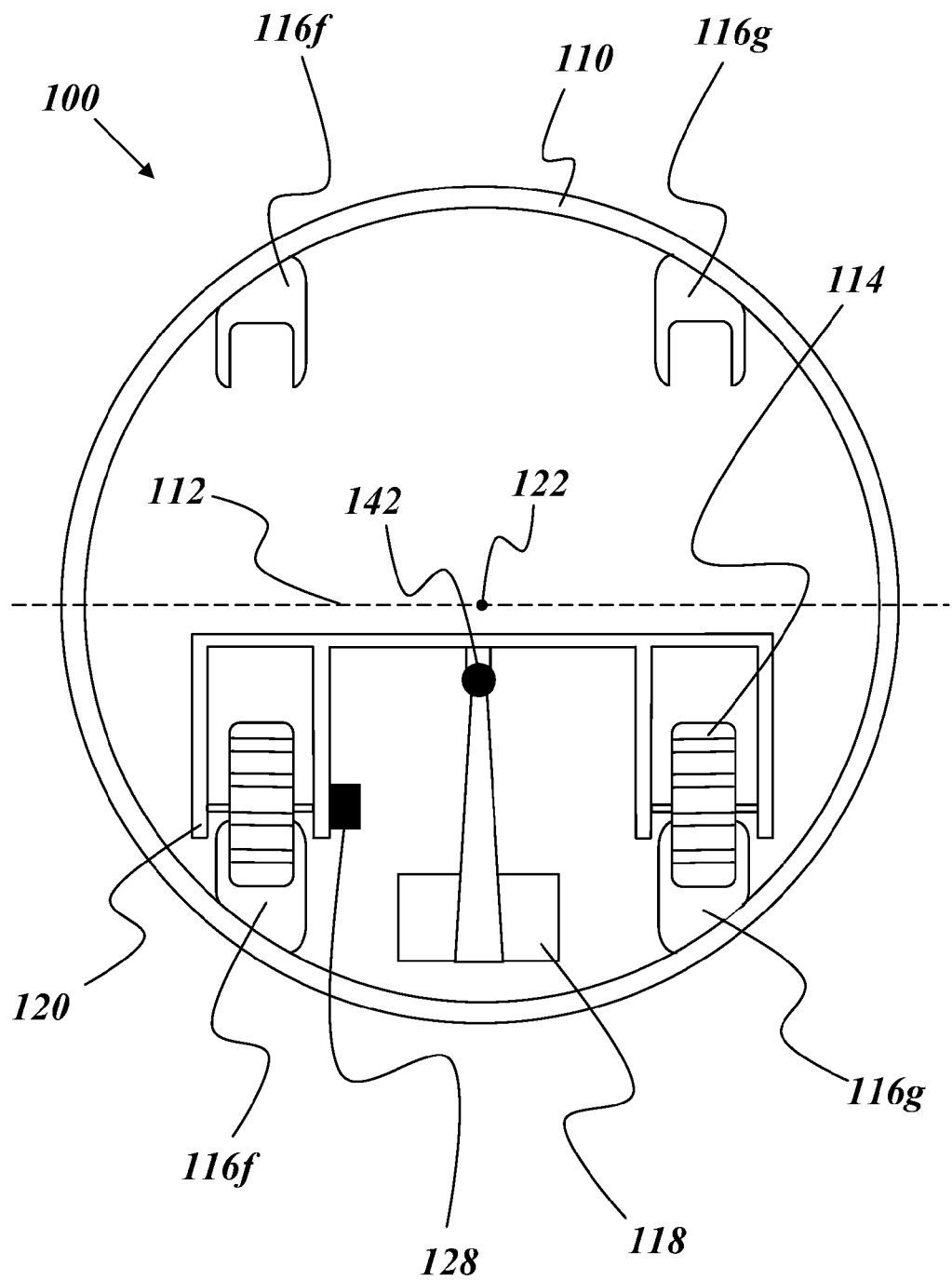
FIG. 8A is a cross-sectional view of an example robotic ball device having two rolling members disposed in a bottom portion thereof, according to embodiments of the present invention.

FIG. 8A illustrates yet another embodiment of the robotic ball device 100 according to the present invention. In the embodiment of FIG. 8A, all of the rolling members 114 are contained in the bottom hemisphere of the robotic ball device 100. Accordingly, the support structure 120 vertically extends across only a portion of one or more vertical cross sections of the inner volume enclosed by the housing 110. The robotic ball device 100 includes two defined pathways 116f and 116g, and further includes the weighted component 118 rotatably coupled to the support structure 120, e.g., by the actuator 142. As previously described herein, during forward linear motion around the first axis 112 of rotation, the robotic ball device 100 can be in a moving frame of reference. Each given rolling member 114 can maintain a substantially constant angular position in a forward vertical plane (i.e., a forward vertical plane that dissects the given rolling member 114) relative to an origin in a moving frame of reference that moves with the robotic ball device 100 (i.e., that moves with the same velocity and direction of the robotic ball device 100). Accordingly, a first forward vertical plane can dissect a first of two rolling members 114, and a second different forward vertical plane can dissect a second of the two rolling members 114.

In the example embodiment of FIG. 8A, tilting or other suitable motion of the weighted component 118 can enable turning and steering capabilities. While not depicted in FIG. 8A, the support structure 120 further can include the horizontal portion 124 of FIGS. 7A and 7B, e.g., to ensure that the rolling members 114 remain disposed on the two defined pathways 116f and 116g.

Figure 8B:
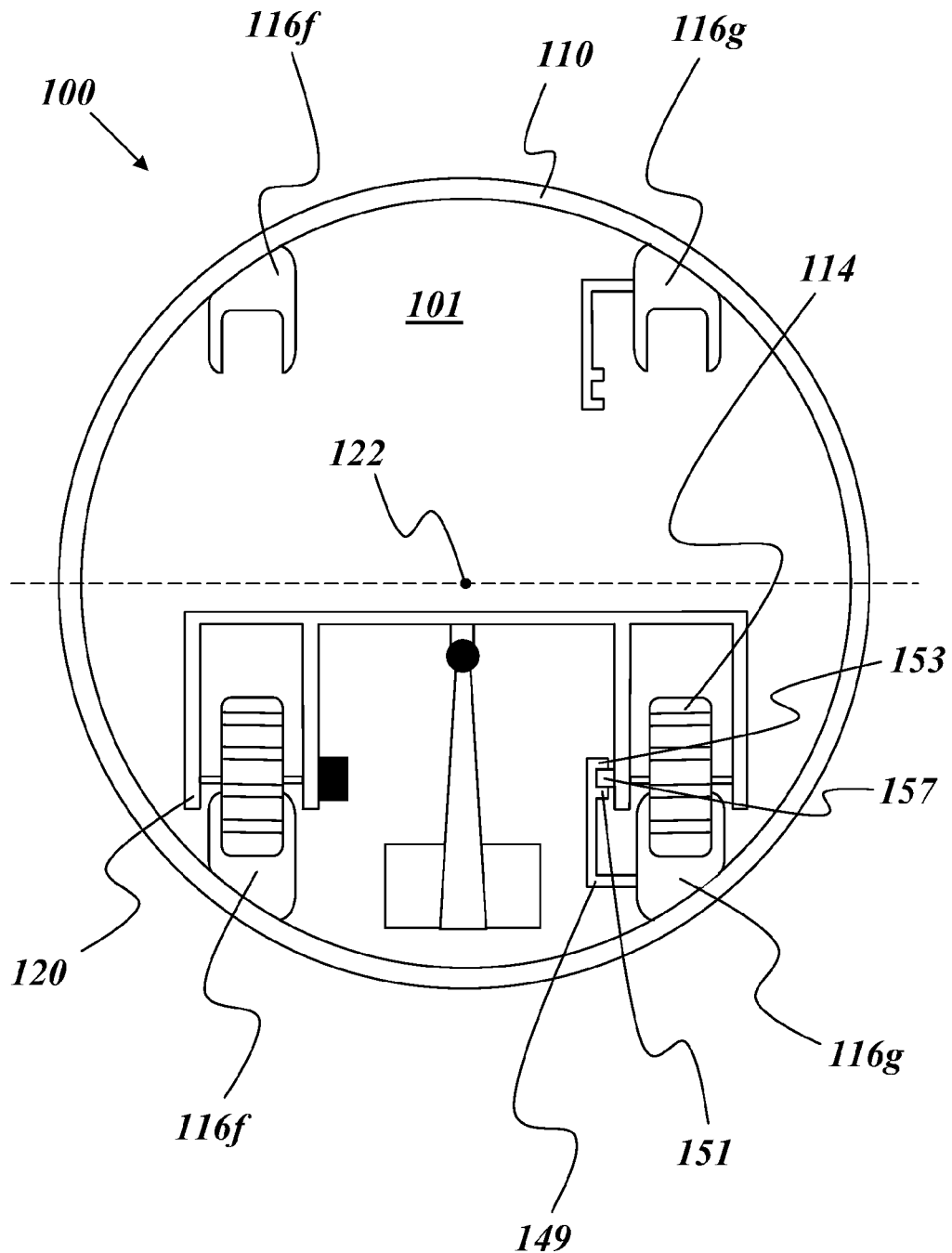
FIG. 8B is a cross-sectional view of the example robotic ball device of FIG. 8A, further including a clasping mechanism for preventing the rolling members from "falling off" the defined pathways, according to embodiments of the present invention.

Additionally or alternatively to providing the horizontal portion 124, one or more clasping mechanisms or other suitable structures can be included for maintaining the vertical position of the rolling members 114 with respect to the center point 122 of the robotic ball device 100. For instance, FIG. 8B depicts an example embodiment of the robotic ball device 100 that further includes a first clasp structure 149 fixedly coupled to, formed integral with, or otherwise fixedly joined with the second defined pathway 116g. The clasp structure 149 can extend circumferentially around a portion of the volume of interior space 101 enclosed by the housing 110, thereby forming a flat circular face. The flat circular face of the clasp structure 149 can be seen in FIG. 8C, which depicts an exploded perspective view of a portion of the right-hand side of the robotic ball device 100 of FIG. 8B. The clasp structure 149 can include a lower overhang portion 151 and an upper overhang portion 153, between which a protrusion 157 on the support structure 120 can fit. For example, the protrusion 157 can have a circular cross section, e.g., can be similar in shape to the rolling members 114 of FIG. 8B.

The protrusion 157 can be coupled to, formed integral with, or otherwise fixedly joined with, the support structure 120. Furthermore, the protrusion 157 can be movably disposed between the lower overhang portion 151 and the upper overhang portion 153, in such a way that as the housing 110 rotates during motion of the robotic ball device 100, the upper overhang portion 153 and the lower overhang portion 151 pass over the protrusion 157. In some alternative embodiments, the protrusion 157 is coupled to other portions or components of the robotic ball device 100. As a further alternative, only a single overhang portion can be included (e.g., only the upper overhang portion 153 can be included).

Figure 8C:
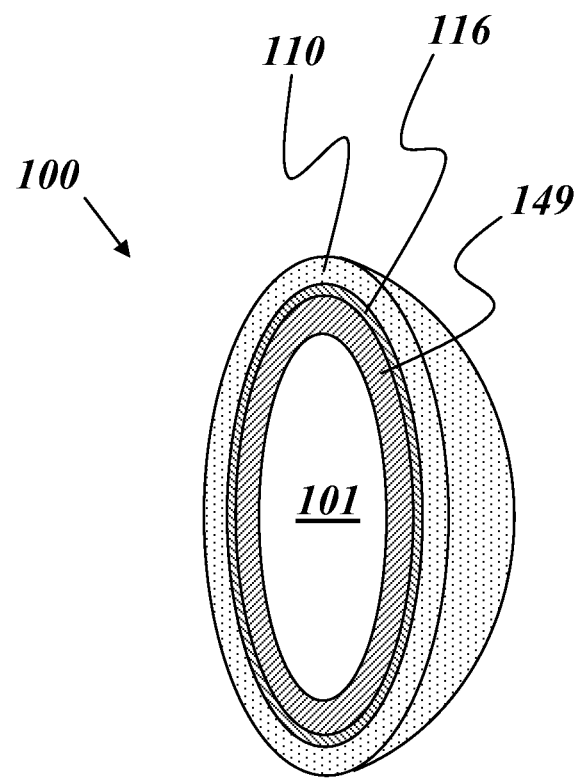
FIG. 8C is an exploded cross sectional view of a portion of the right-hand side of the robotic ball device of FIG. 8B, according to aspects of the present invention.

While depicted with reference to FIGS. 8A through 8C, the clasp structure 149 can be included in any other embodiment described herein, as would be appreciated by one of skill in the art. Furthermore, multiple such clasp structures 149 can be included in a single robotic ball device 100, e.g., on multiple defined pathways 116 or on multiple different sides of a single defined pathway 116. In general, one of skill in the art will appreciate that the example clasp structure 149 of FIGS. 8B and 8C is illustrative and does not limit embodiments of the present invention. Rather, a wide range of other clasping mechanisms or other suitable structures can be utilized to prevent the rolling member(s) 114 from "falling off" the defined pathway(s) 116 (i.e., to maintain the rolling member(s) 114 in a substantially constant vertical position with respect to the center point 122 of the robotic ball device 100).

FIGS. 9 through 17B depict additional features that generally can be included with the robotic ball device 100. While FIGS. 9 through 17B illustrate various additional features in isolation from one another and in connection with the example embodiment of FIG. 8A, one of skill can appreciate that, in general, any of the additional features and components described herein can be included in other embodiments unless otherwise stated, either explicitly or by context. For example, any of the embodiments described herein may include any one or more of the following components: a horizontal portion of the support structure, one or more processors, one or more communications devices, one or more display systems, one or more sensors (e.g., capacitive sensors) one or more cameras, one or more access doors, one or more suspension mechanisms, one or more cartridge ports, one or more "on-the-shell" compartments, one or more weighted components configured to spin in a flywheel configuration, or any other suitable additional components.

Figure 9A:
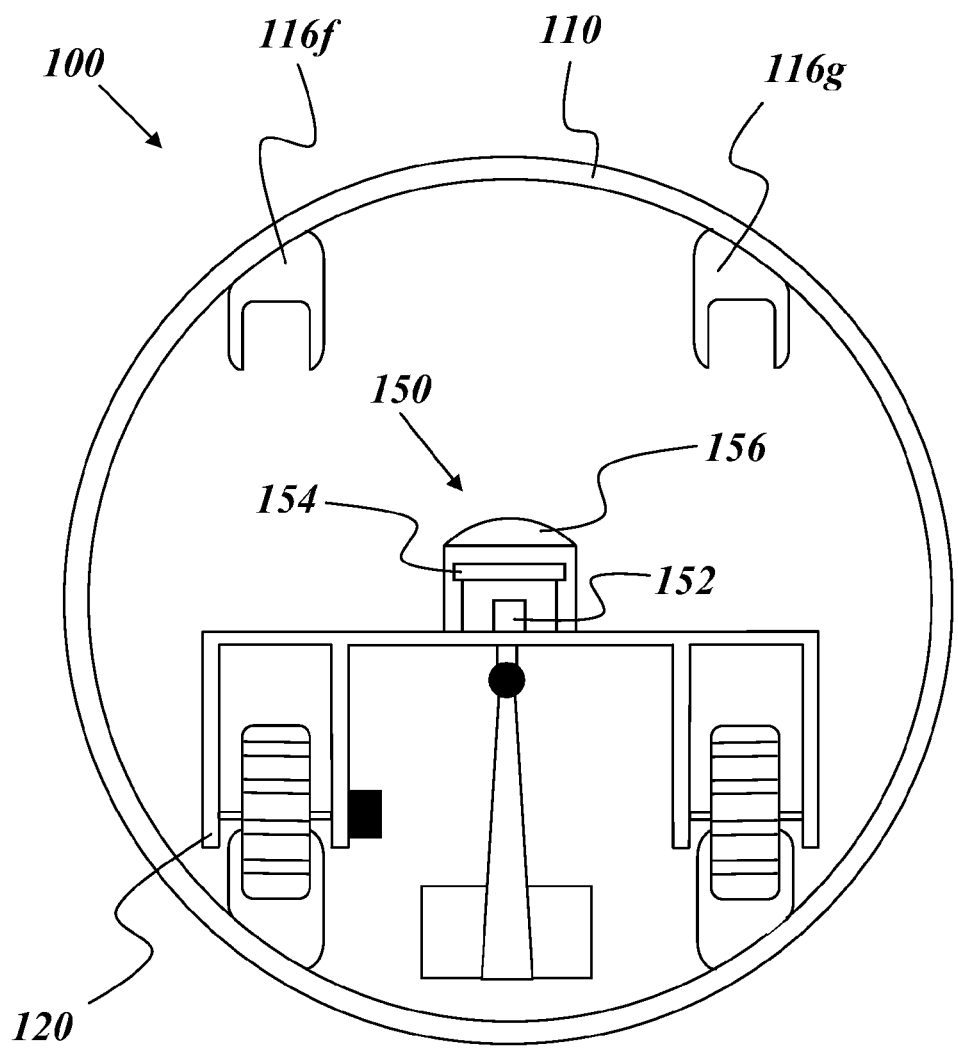
FIG. 9A is a cross-sectional view of the robotic ball device as depicted in FIG. 8A, further including an example projection display, according to aspects of the present invention.

FIG. 9A depicts a display system 150 for projecting a display onto a surface of the housing 110. The display system 150 is contained entirely within the inner volume of interior space enclosed by housing 110. The example display system 150 includes a projection unit 152, a flat display 154, and a lens 156. The flat display 154 can be a liquid crystal display (LCD), e.g., to minimize power consumption and thus energy supply requirements of the robotic ball device 100. The lens 156 can be configured to convert the flat image projected from the projection unit 152 into a curved image having a radius of curvature suitable for allowing the curved image to be displayed by a user on an upper curved portion of the housing 110. Furthermore, one or more additional lenses can be included, e.g., for concentrating the projected image in order to improve image quality.

Alternatively, the display system 150 can be replaced by any other suitable display unit, projector unit, projector, or the like. For instance, any suitable commercially available projector may be used, such as a projector manufactured by Texas Instruments Incorporated, located in Dallas, Tex.

In such embodiments, the housing 110 can comprise a material suitable for forming a screen on which a projected image can be clearly viewed by a user (e.g., a transparent or partially transparent material). Furthermore, the material of the housing 110 can be a material that requires little or no back-lighting for the projected display to be visible to a user (e.g., E-Ink screen or OLED screen), thereby enabling users to view projected displays while the robotic ball device 100 is outside and exposed to sunlight or other forms of light that create a glare on screens requiring back-lighting. In this manner, the robotic ball device 100 can include a rotating screen, which is formed by at least a portion of the housing 110, and which rotates during motion of the robotic ball device 100.

Figure 9B:
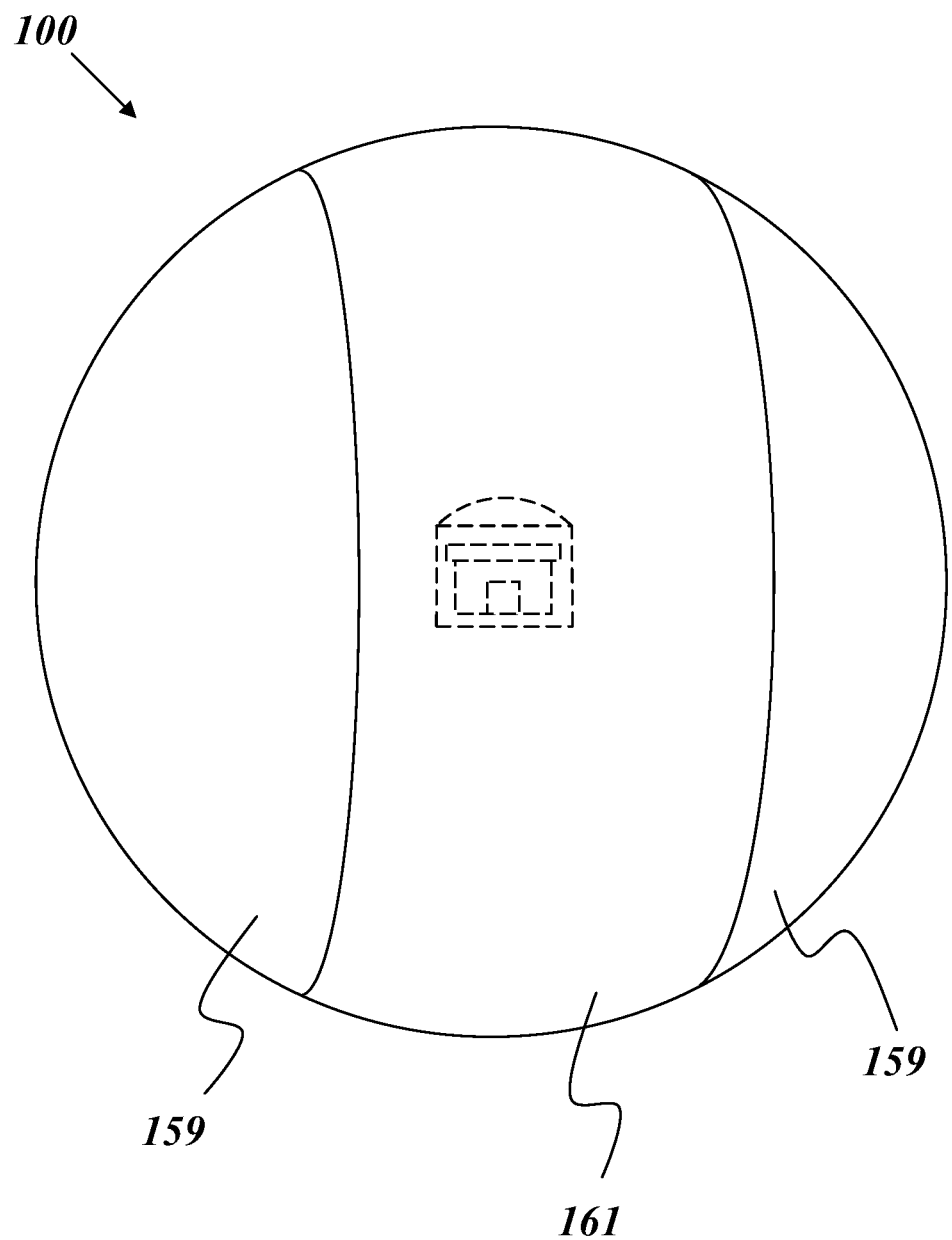
FIG. 9B is a diagrammatic illustration of the robotic ball device of FIG. 9A, further including at least two different housing portions each constructed from different material(s), according to aspects of the present invention.

FIG. 9B illustrates the exterior of the robotic ball device 100 of FIG. 9A from a perspective view, and with the display system 150 (located in the interior of the robotic ball device 100) shown for reference in dashed lines. In general, the robotic ball device 100 includes one or more different housing portions that are constructed from different materials. In the example embodiment of FIG. 9B, the robotic ball device 100 includes at least one portion 161 that forms the screen and one or more other portions 159 that are constructed from a different material, on which displays are not visible to a user. As an alternative, the entire housing 110 can be constructed from the same material(s), which can be suitable for forming the screen. While the display system 150 is configured to project a display in an upward direction, the display system 150 alternatively or additionally can positioned and oriented to project a display in any other direction. Furthermore, multiple such display systems 150 can be included to provide numerous different displays, which can be independent of one another or which can be coordinated and synchronized in some fashion.

Figure 10A:
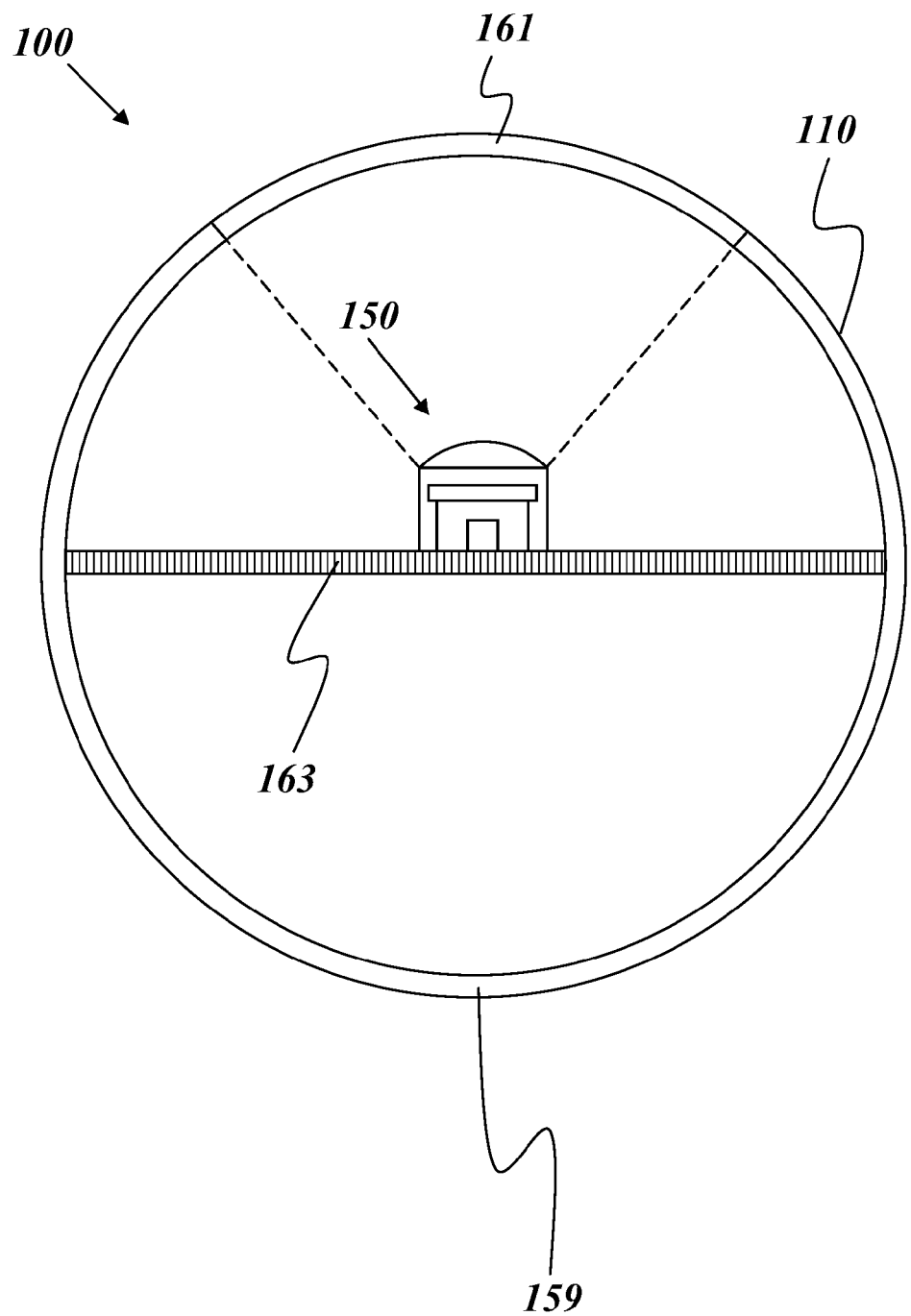
FIG. 10A is a cross-sectional view of a robotic ball device having a first example display system configured to rotate with the housing, according to further aspects of the present invention.

Alternatively, the display system 150 (or equivalents thereof) can be fixedly coupled to an affixed support structure that is coupled to the housing 110 in such a way as to rotate with the housing 110. Accordingly, the display system 150 can be configured to rotate with the housing 110 while projecting an image onto a non-changing portion of the housing forming a screen. For example, one such embodiment is depicted in FIG. 10A, which depicts the display system 150 fixedly coupled to an affixed support structure 163 fixedly (e.g., non-rotatably) coupled to the housing 110. The display system 150 is depicted in an upwardly facing position. The portion 161 forming the screen is situated at a position sufficient for receiving a display to be projected by the display system 150 thereon. As the housing 110 rotates, the display system 150 rotates with it, thus enabling a projected image to be continuously projecting by the display system 150 onto the portion 161 forming the screen during motion of the robotic ball device 100.

Figure 10B:
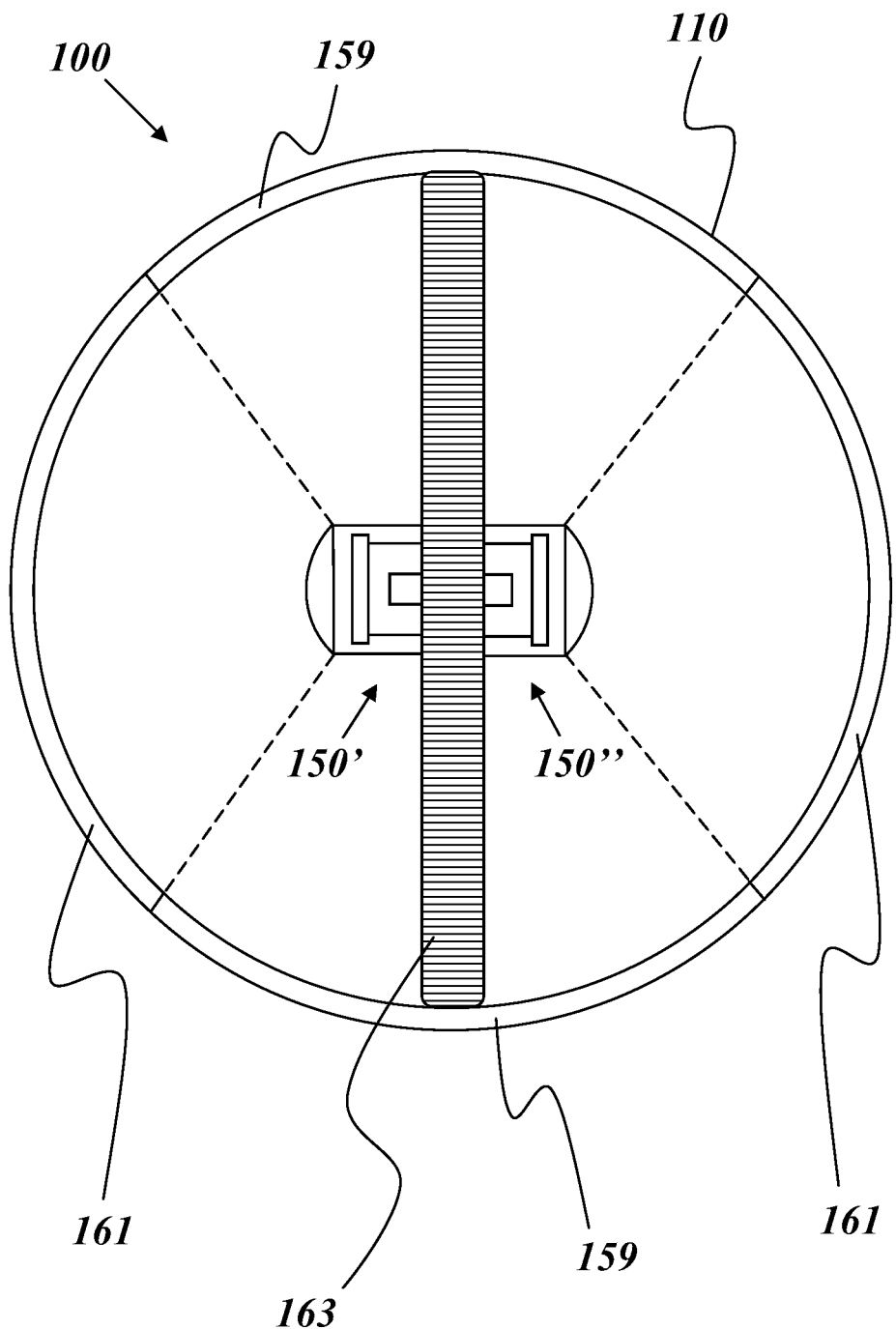
FIG. 10B is a cross-sectional view of a robotic ball device having a second example display system configured to rotate with the housing, according to further aspects of the present invention.

In the example embodiment of FIG. 10A, the affixed support structure 163 is horizontally flat. However, other orientations, sizes, shapes, and positions of the affixed support structure 163 are possible. For instance, FIG. 10B depicts an alternative embodiment of the robotic ball device 100 that includes the affixed support structure 163 positioned in a vertically upright orientation. Additionally, as depicted in the example embodiment of FIG. 10B, multiple display systems 150 can be included, such as first example display system 150' and second example display system 150". Accordingly, the housing 110 can include multiple portions 161 each forming a separate screen for receiving images projected by the different display systems 150' and 150".

While not depicted in FIGS. 10A and 10B for purposes of clarity, it will be understood by one of skill in the art upon reading the present specification that the robotic ball device 100 of FIGS. 10A and 10B additionally can include one or more defined pathways 116 and one or more rolling members 114 movably disposed thereon, as described previously herein. For example, the display system 150 and affixed support structure 163 as depicted in FIG. 10A can be included at least in the robotic ball device 100 as depicted in FIG. 8A. As another example the display systems 150' and 150" and affixed support structure 163 as depicted in FIG. 10B can be included in the example embodiment of FIG. 10C.

Figure 10C:
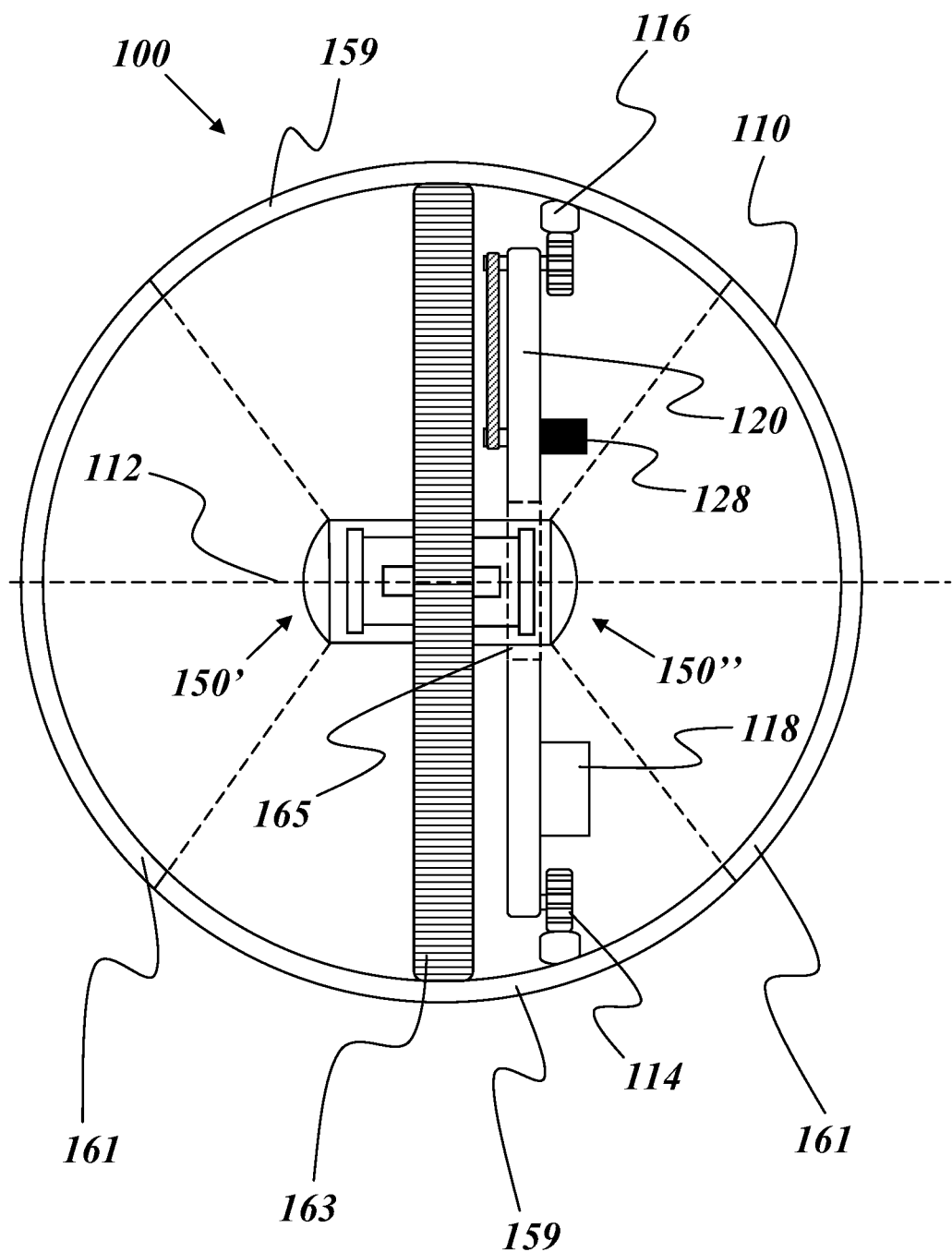
FIG. 10C is a cross-sectional view of the robotic ball device of FIG. 10B further including two defined pathways and two vertically upright support structures, according to further aspects of the present invention.

In the example embodiment of FIG. 10C, the support structure 120 is rotatably coupled to the rolling members 114, which are each movably disposed on the defined pathway 116. The support structure 120 is oriented and positioned in a vertically upright manner. The support structure 120 can be positioned in such a way as to avoid disrupting images being projected. For example, as depicted, the support structure 120 can include an opening 165 through which all or part of the display system 150" passes. For example, the opening 165 can be a central opening situated around the center of the support structure 120 and entirely contained within an outer perimeter of the support structure 120. Furthermore, the opening 165 and the display system 150" both can be aligned along the first axis 112 of rotation. Accordingly, as the robotic ball device 100 rolls forward at a constant velocity and in a straight line, the display system 150" rotates (i.e., at the same angular velocity of the robotic ball device 100) within the opening 165 of the support structure 120, while the support structure 120 does not substantially rotate (i.e., has an angular velocity of about zero).

Figure 11:
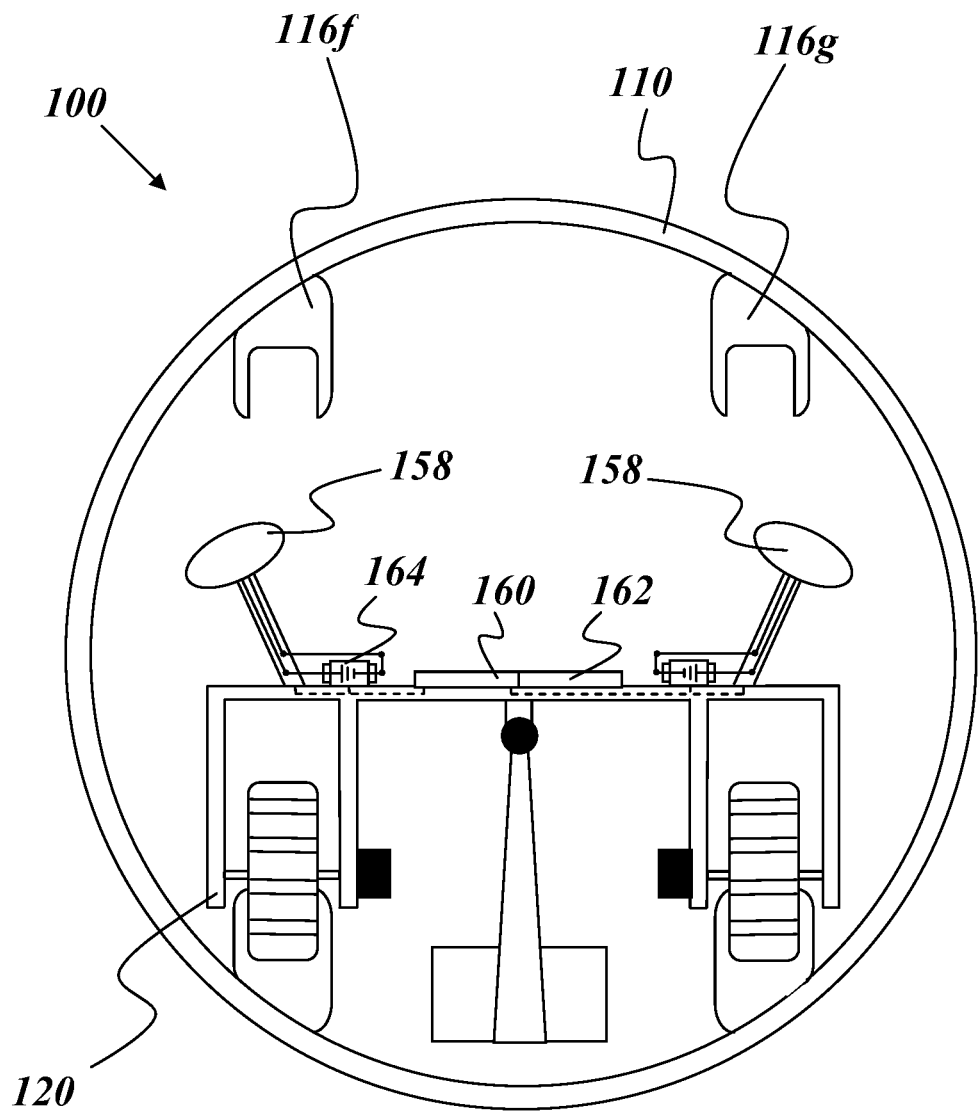
FIG. 11 is a cross-sectional view of the robotic ball device as depicted in FIG. 8A, further including one or more example capacitive sensors and related components, according to aspects of the present invention.

FIG. 11 depicts the robotic ball device 100 further including one or more sensors, such as capacitive sensors 158. The capacitive sensors 158 can be configured to detect nearby objects, such as walls, humans, pets/animals, and other objects. Alternatively or additionally to the capacitive sensors 158, the robotic ball device 100 can include ultrasonic sensors or yet other sensors. In illustrative embodiments, sensitivity of the capacitive sensors 158 can be made adjustable (e.g., in a coordinated fashion or independently for each of the capacitive sensors 158), to change the types, sizes, proximity, etc. of detected objects. For instance, the sensitivity of the capacitive sensors 158 can be sufficient to detect objects located a particular desired distance away from the robotic ball device 100. Generally, the sensitivity of the capacitive sensors 158 can be manipulated using various software techniques, such as data processing, signal enhancement or degradation, noise reduction, etc., and/or using physical techniques.

For instance, in the example embodiment of FIG. 11, software control over the capacitive sensors 158 can be enabled by a processor 160 and/or a computer readable storage medium 162, both of which can be mounted to, or housed in, the support structure 120. The computer readable storage medium 162 can contain instructions stored thereon that, when executed by the processor 160, cause software modules to filter, average, and/or apply data processing to input signals received from the capacitive sensors 158, such that any received input signal having a strength below a threshold value is treated as undetected. The threshold value can be predetermined, randomly determined, variable, preset, controlled remotely through communication with a communications device (not shown) included in the robotic ball device 100, etc. In general, the processor 160 and/or computer readable storage medium 162 may be internal components of the capacitive sensors 158, or may be separate components from the capacitive sensors 158.

Yet as further alternatives or additions, the sensitivity of the capacitive sensors 158 can be adjusted using physical techniques. For example, the capacitive sensors 158 can be coupled to one or more voltage sources 164 that are controlled by the processor 160. The processor 160 can be caused to adjust the voltage level being applied by the voltage sources 164 to the capacitive sensors 158, thereby causing a change in the sensitivity of the capacitive sensors 158. In particular, the processor 160 may adjust the applied voltage level(s) in response to executing instructions stored on the computer readable storage medium 162. Alternatively, the processor 160 may adjust the applied voltage level(s) in response to a signal being received by a communications device (not shown) from a remote device (e.g., a remote computer, a remote controller, a satellite, GPS, etc.).

The example embodiment described with reference to FIG. 11 is illustrative and does limit the scope of the present invention. One of skill in the art will appreciate a wide variety of alternative mechanisms and techniques for adjusting the sensitivity of the capacitive sensors 158 upon reading the present specification, which can be performed using remote control, non-remote control, or both. As one additional example, the capacitive sensors 158 may be mounted on movable elements (not shown) which allow for the position of the capacitive sensors 158 to be adjusted in order to produce a particular desired level of sensitivity in the capacitive sensors 158.

In general, the sensitivity of the capacitive sensors 158 can be adjusted to a wide variety of suitable levels. In an illustrative embodiment, the capacitive sensors 158 are adjusted to have a sensitivity sufficient to detect particular objects in close enough proximity to be in contact with the robotic ball device 100. For example, the capacitive sensors 158 can be configured to detect human contact with the housing 110 of the robotic ball device 100. Alternatively or additionally, the capacitive sensors 158 can be configured to detect contact by the housing 110 with walls, furniture, and other objects in a surrounding external environment. In general, many other settings and levels of sensitivity of the capacitive sensors 158 can be provided such that the robotic ball device 100 detects particular objects located within a predetermined region, radius, area, etc. of the robotic ball device 100.

In general, the capacitive sensors 158 may be placed at the any suitable position in or on the robotic ball device 100, and/or mounted to any suitable component of the robotic ball device 100. For example, the capacitive sensors 158 may be coupled to the housing 110 (e.g., on an inner or outer face of the housing 110), to the support structure 120, or to any other component of the robotic ball device 100, including both interior and exterior components. Furthermore, the capacitive sensors 158 can be coupled to a different support structure, which is fixedly and non-rotatably coupled to the housing 110 (i.e., that rotates with the housing 110). As still further possibilities, the capacitive sensors 158 may be contained within interior compartments of the housing 110, formed integral with the housing 110, or otherwise joined with the housing 110. For example, the housing 110 can be formed of one or more non-conductive (e.g., insulating) materials and one or more conductive (e.g., metallic) materials, and the one or more conductive materials can form portions of the capacitive sensors 158.

In all such embodiments, the capacitive sensors 158 can be configured as described herein with reference FIG. 11, e.g., for sensing contact between a human (or object, etc.) and some portion of the robotic ball device 100. In general, a wide range of other possibilities and alternatives will be appreciated by one of skill in the art upon reading the present specification. All such alternatives are contemplated within the scope of the present invention.

Figure 12:
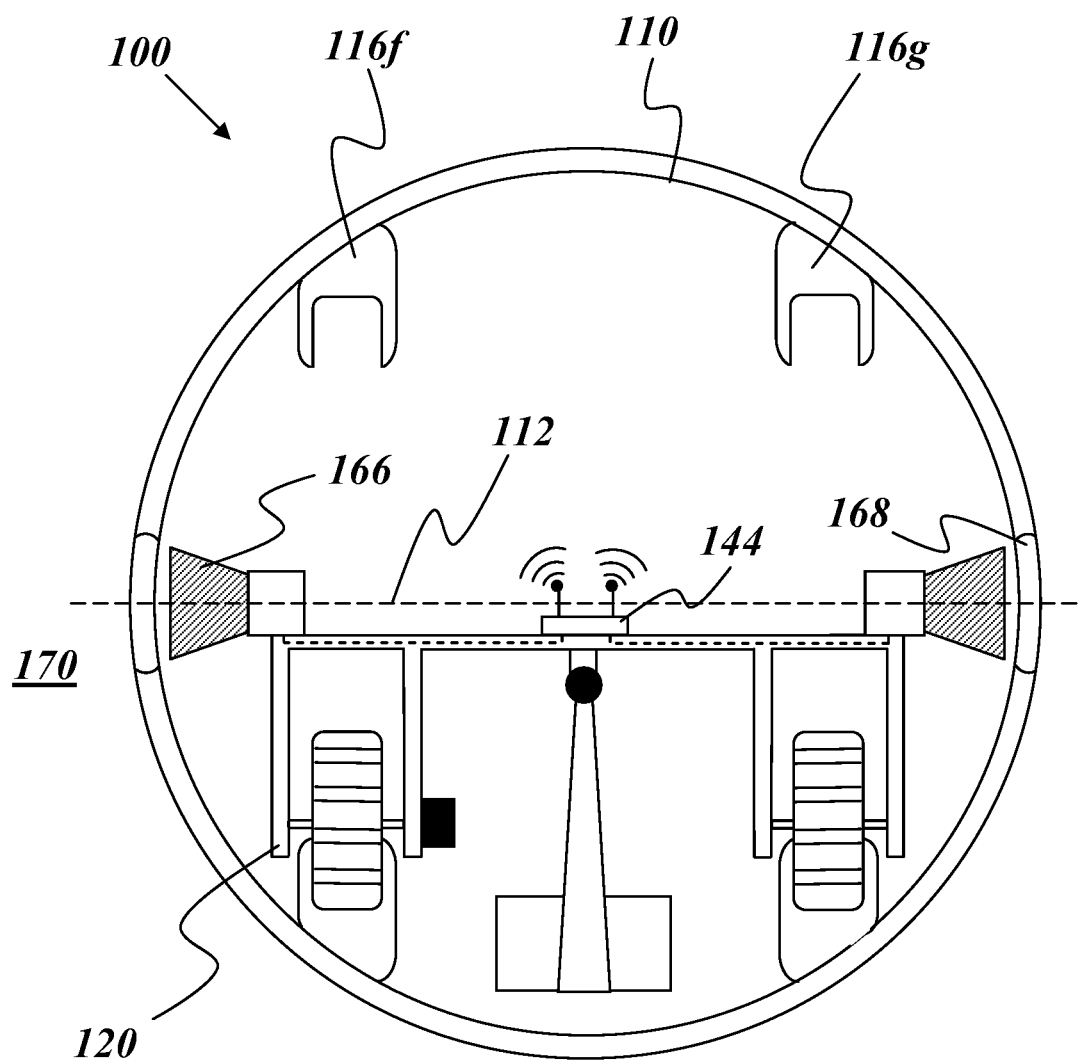
FIG. 12 is a cross-sectional view of the robotic ball device as depicted in FIG. 8A, further including one or more example cameras and related components, according to aspects of the present invention.

FIG. 12 illustrates a further embodiment wherein the robotic ball device 100 additionally includes one or more cameras 166. The cameras 166 can be mounted to the support structure 120, and can be positioned and oriented such that they point in any desired direction, e.g., any outward-facing direction. In embodiments where the cameras 166 face in one or more outward directions, the robotic ball device 100 additionally can include portions 168 of the housing 110 that allow the cameras to detect and view an external environment 170. For example, the portions 168 of the housing 110 can be constructed from transparent and/or partially transparent material(s). Alternatively, the entire housing 110 may be constructed from such suitable material, in such a way that that the portion 168 makes up the entire housing 110.

The cameras 166 may be fixedly secured (and thus stationary) to the support structure 120, or the cameras 166 may be mounted on movable elements (not shown) which allow for motion, repositioning, adjustment, and/or reorienting of the cameras 166. Furthermore, while the cameras 166 are positioned in the embodiment of FIG. 12 to be aligned to lie along the first axis 112 of rotation, the cameras can be positioned and mounted at any other suitable position. For example, in other embodiments, the cameras 166 are positioned such that they lie along a vertical axis passing through the center point 122 of the robotic ball device 100. In such embodiments (or in other embodiments), the cameras 166 can be oriented to be facing up or down, so as to outwardly face the portion of the external environment 170 that is below or above the robotic ball device 100.

Figure 13A:
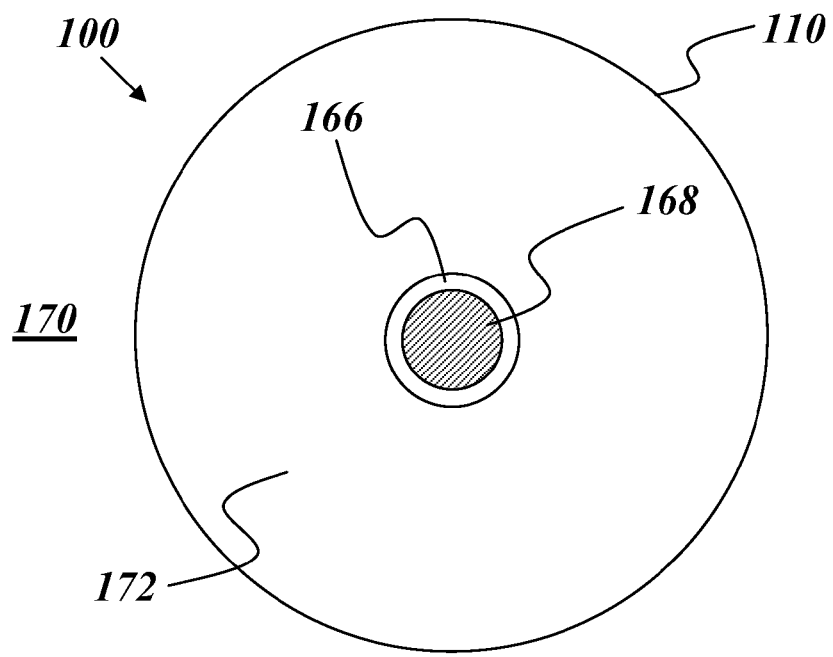
FIG. 13A is a side view of the robotic ball device of FIG. 12, further including one or more housing portions specifically equipped for housing the example cameras, according to aspects of the present invention.
Figure 13B:
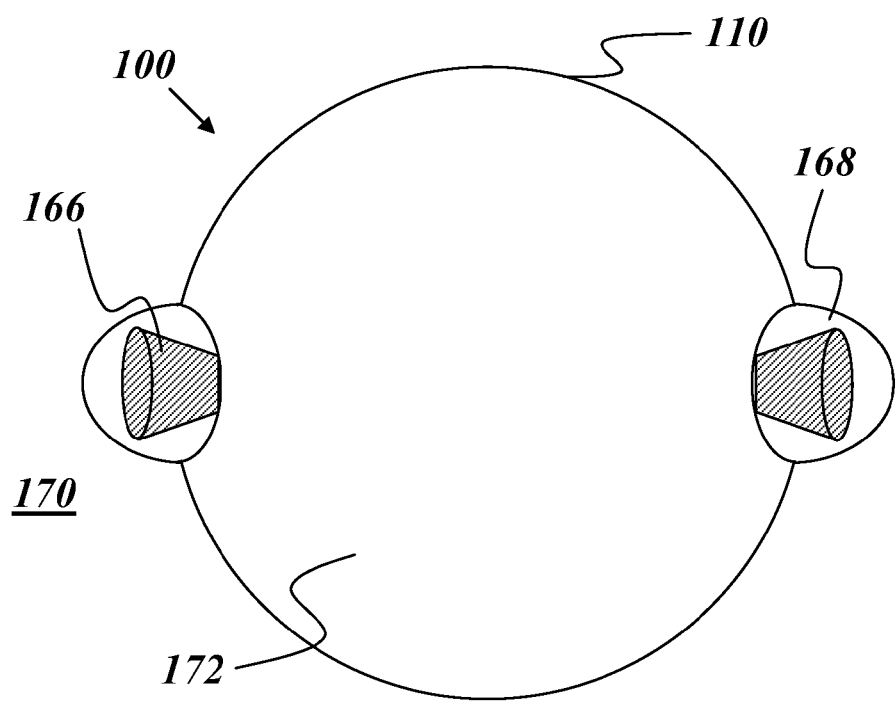
FIG. 13B is a front view of the robotic ball device of FIG. 13A, according to aspects of the present invention.

The portions 168 of the housing 110 that allow for the cameras 166 to view the external environment 170 can be shaped continuously with the overall shape of the housing 110. Alternatively, the portions 168 can be provided with a shape that deviates from the shape of the overall shape of the housing 110. For example, FIGS. 13A and 13B depict such an embodiment of the robotic ball device 100 of FIG. 11 from a side view and a front view, respectively. Specifically, in the embodiment of FIGS. 13A and 13B, the portion 168 of the housing 110 forms a bulge or protuberance deviating away from an otherwise generally spherical portion 172. For example, in illustrative embodiments, the portion 168 can be generally egg-shaped, in order to allow the cameras 166 to move and/or reorient to capture different views of the external environment 170. Accordingly, in the example embodiment of FIGS. 13A and 13B, the cameras 166 extend into the portion 168 of the housing 110.

Returning to FIG. 12, in embodiments wherein one or more cameras 166 are included, the robotic ball device 100 further can include the communications device 144 for transmitting and/or receiving information to and/or from a remote location. For example, the cameras 166 generally can be connected to the communications device 144 for transmitting a signal, video feed, photographs, or other information and/or data received from the cameras 166 to a remote location (e.g., a remote computer, remote satellite, etc.) in real time, at predetermined intervals, upon receiving a request to transmit data, etc. Alternatively, the signal, video feed, photographs, or other information and/or data can be stored in one or more removable and/or replaceable machine readable storage devices (e.g., a "memory stick," a "memory cartridge," a "memory card," and the like) that can be included in the robotic ball device 100. In such embodiments, the robotic ball device 100 further can include port or compartment configured for receiving the computer readable storage media, as would be appreciated by one of skill in the art.

Figure 14A:
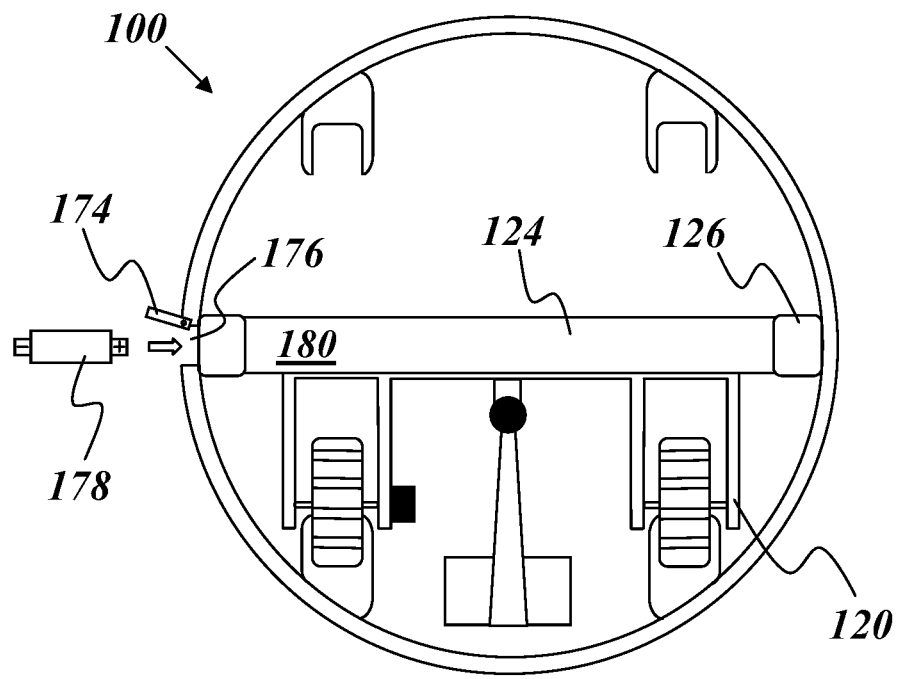
FIG. 14A is a diagrammatic illustration of the robotic ball device as depicted in FIG. 8A, further including an example battery receptacle coupled or otherwise joined with a support structure on the robotic ball device, according to aspects of the present invention.
Figure 14B:
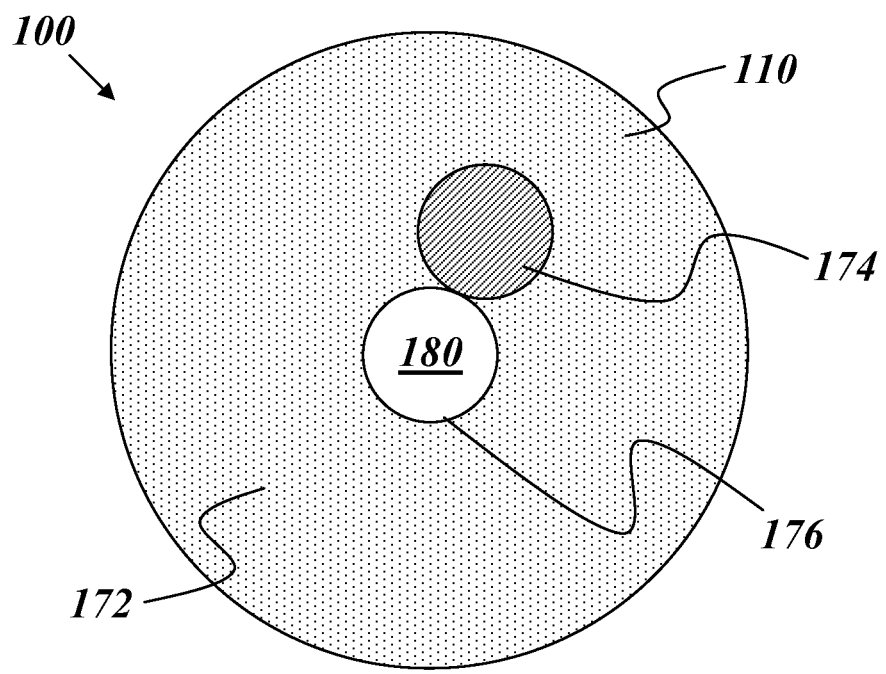
FIG. 14B is a side view of the robotic ball device of FIG. 14A, according to aspects of the present invention.

FIGS. 14A and 14B illustrate a further embodiment of the robotic ball device 100 that includes the horizontal portion 124 of the support structure 120. As previously described herein, the horizontal portion can be rotatably coupled to the housing 110 by the one or more coupling pieces 126, which can include bearings, bushings, rolling members (e.g., rollers, wheels, gears, spheres, balls, and the like), and other coupling pieces configured to enable rotational motion of the housing 110 around the horizontal portion 124. The horizontal portion 124 can be generally cylindrical shaped and can be circumferentially aligned along the first axis 112 of rotation. Generally, the horizontal portion 124 can be hollow or can be partially hollow, so as to house one or more components to be included in the robotic ball device 100.

In the example embodiment of FIGS. 14A and 14B, an interior volume of the horizontal portion 124 is at least partially hollow and equipped to receive one or more batteries 178 or other power sources for supplying power to one or more components of the robotic ball device 100 (e.g., the actuator 128, the actuator 142, etc.). Thus, the interior hollow portion of the example horizontal portion 124 can form a central annular compartment configured as a battery receptacle 180. Accordingly, as would be appreciated by one of skill in the art, the battery receptacle 180 can include one or more electrical components, wires, slip rings, and the like, for utilizing energy stored in the batteries 178 or other power sources as an energy supply for one or more other components.

While the hollow interior portion of the horizontal portion 124 is configured to serve as the battery receptacle 180 in the example embodiment of FIGS. 14A and 14B, one of skill in the art will appreciate that, in general, the hollow interior portion of the support structure 120 can serve as a compartment for suitably receiving one or more other forms of power supplies, or for housing any other (e.g., electrical) components of the robotic ball device 100.

Continuing with FIGS. 14A and 14B, the robotic ball device 100 additionally can include an access door 174 that can be opened and closed, secured and unsecured, removed and attached, or a combination thereof. Accordingly, in a first configuration of the access door 174, the access door 174 covers an access opening 176 and restricts access to the battery receptacle 180. In a second configuration of the access door 174, the access opening 176 is uncovered by the access door 174, thereby providing access to the battery receptacle 180. In this manner, the batteries 178 or other power source(s) to be situated in the battery receptacle 180 can be replaceable by adjusting the access door 174 between the two configurations.

One of skill in the art will appreciate a wide variety of ways to implement the access door 174. For example, the access door 174 can be removably attached (e.g., can be both detachable and re-attachable in an operationally viable mode) to the housing 110. For instance, the access door 174 can be removably attached to the housing 110 by one or more fastening members, such as turn-and-lock fastening members, push-and-turn fastening members, corresponding male and female fastening members, magnetic fastening members, snapping fastening members, hook-and-loop fastening members, and any other fastening members. Additionally or alternatively, the access door 174 can be pivotally coupled to the housing 110, e.g., by a hinge. In the embodiments of FIGS. 14A and 14B, the access door 174 is depicted in an open configuration, thereby providing access to the battery receptacle 180.

Figure 15A:
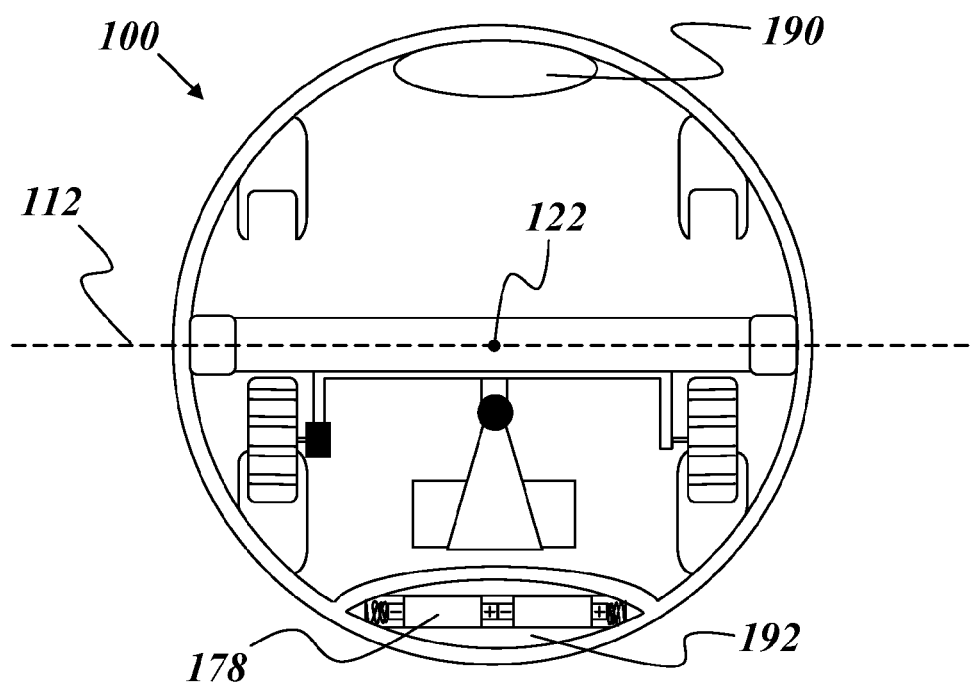
FIG. 15A is a cross-sectional view of an example robotic ball device that includes an example compartment coupled or otherwise joined with a housing of the robotic ball device, according to embodiments of the present invention.
Figure 15B:
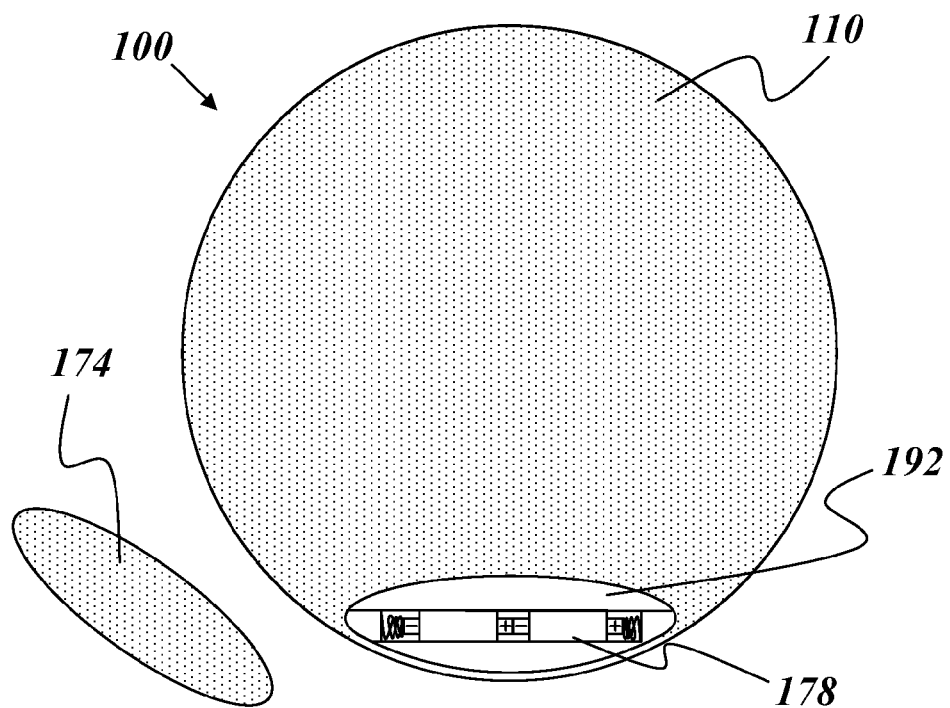
FIG. 15B is a front view of the robotic ball device of FIG. 15A, according to further aspects of the present invention.

FIGS. 15A and 15B depict another embodiment of the robotic ball device 100. In the embodiment of FIGS. 15A and 15B, the robotic ball device 100 includes a compartment 192 coupled to, formed integral with, or otherwise joined to, the housing 110. The compartment 192 can be covered by the access door 174, which can be detachable and re-attachable, e.g., in an operationally viable mode of use. The compartment 192 can be configured to receive one or more power sources such as the batteries 178. Accordingly, the robotic ball device 100 can include one or more electrical components, wires, slip rings, and the like for utilizing the energy stored in the power sources as a power supply for one or more other components.

The compartment 192 can be situated at any suitable position. The compartment 192 can be fixedly joined with the housing 110 in such a way so as to rotate with the housing 110 when the housing 110 is rotating. The compartment 192 can be positioned such that its center point lies along a vertical axis passing through the center point 122 of the robotic ball device 100. Alternatively, the vertical center of the compartment 192 can be horizontally offset from the center point 122 of the robotic ball device 100. Multiple such compartments 192 can be included, each occupying a different area on the housing 110.

If so desired, the robotic ball device 100 can be enabled to roll with steady, even motion by further including one or more additional weighted components 190 (e.g., coupled to or joined with the housing 110). For example, one additional weighted component 190 can be placed in a position on the housing 110 opposite the compartment 192, so as to "balance" the weight of the compartment 192 and any/all components contained therein. In general, the additional weighted component 190 can be any suitable weighted component. In fact, in some embodiments, the weighted component 190 includes a second such compartment 192 for receiving one or more additional batteries 178 or other power sources.

Figure 16A:
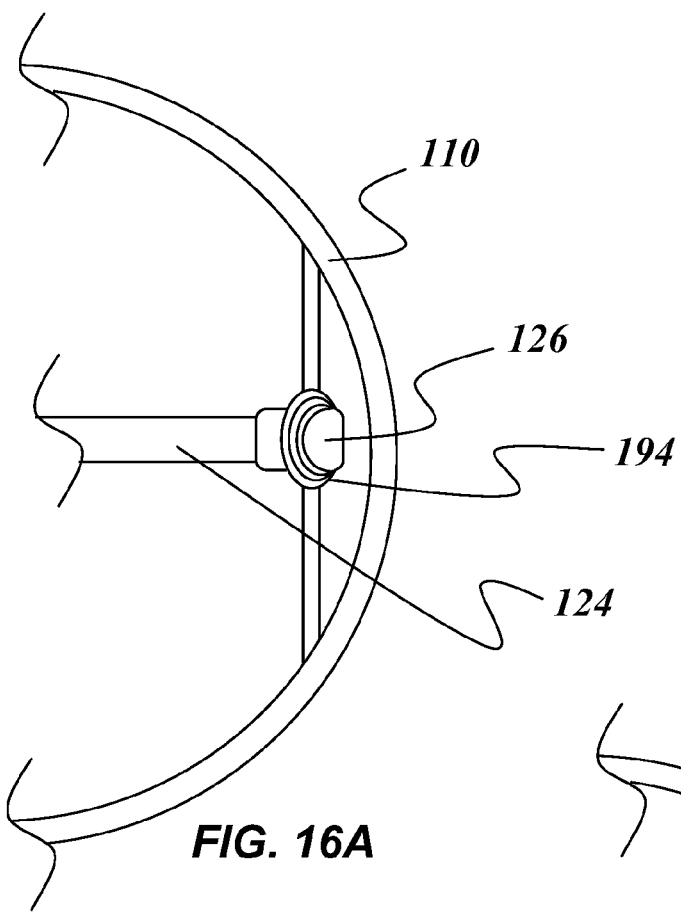
FIG. 16A is a diagrammatic illustration of an example spiral suspension mechanism for supporting a horizontal portion of a support structure, according to aspects of the present invention.

In embodiments of the robotic ball device 100 that include the horizontal portion 124, the horizontal portion can be coupled to the housing 110 by the one or more coupling pieces 126. The horizontal portion 124 and/or the one or more coupling pieces 126 generally can be supported by one or more suspension mechanisms. For example, FIG. 16A depicts a right side of the horizontal portion 124 rotatably disposed within the coupling piece 126. In the depicted embodiment, the horizontal portion 124 and the coupling piece 126 are supported by a spiral suspension 194, which can be coupled (e.g., operationally) or mounted to the housing 110. For example, the spiral suspension 194 can comprise one or more spiral-shaped wires having a flexibility sufficient to absorb some or all of stress (e.g., caused by external forces) that the robotic ball device 100 may encounter during operation and/or use. Such a suspension mechanism can increase operational lifetime of the robotic ball device 100, as well as its components included therein.

Figure 16B:
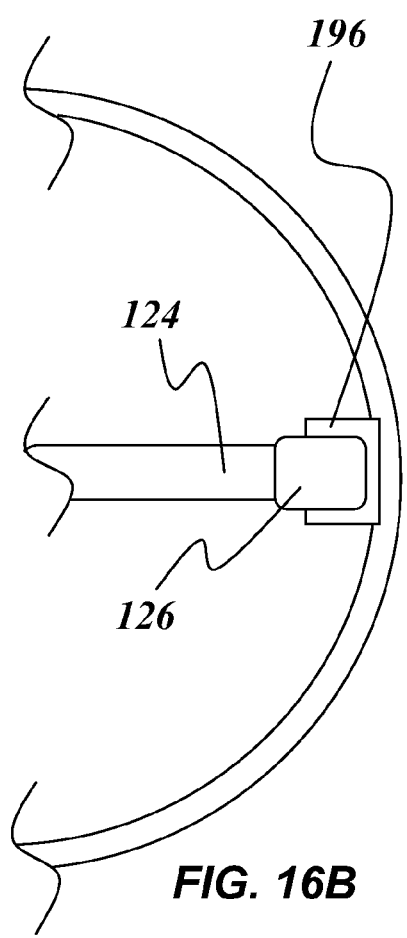
FIG. 16B is a diagrammatic illustration of an example suspension mechanism that includes a compressible portion for supporting a horizontal portion of a support structure, according to aspects of the present invention.

Other suspension mechanisms can be used to support the horizontal portion 124 and/or the coupling pieces 126. For example, FIG. 16B depicts one or more compressible portions 196 constructed from soft materials. The soft materials can be embedded in, coupled to, or otherwise joined with, the housing 110 to form the compressible portions 196. The soft materials forming the compressible portion 196 can be characterized by a flexibility that is sufficient to compress and thereby absorb some or all of the stress (e.g., caused by external forces) that the robotic ball device 100 may encounter during operation and/or use.

Furthermore, still other suspension mechanisms are possible. For example, in some embodiments, traditional spring-based suspension mechanisms (e.g., shocks) are included. In yet other embodiments, the housing 110 can include one or more soft layers. For instance, the housing 110 can include an inner soft layer that is in contact with the coupling piece 126 and/or the horizontal portion 124. Alternatively or additionally, the housing 110 can include a soft outer layer as an outermost layer on which the robotic ball device 100 rolls. As yet a further alternative, the housing 110 can include a soft medial layer that is disposed between two layers having relatively less flexibility. In illustrative embodiments, the soft layers are constructed from material(s) having a flexibility sufficient to deform/compress in response to forces (e.g., externally caused), thereby "absorbing" stresses caused by operation, preventing such stresses from negatively impacting internal components of the robotic ball device 100, and improving the overall durability and useable lifetime of the robotic ball device 100.

Figure 16C:
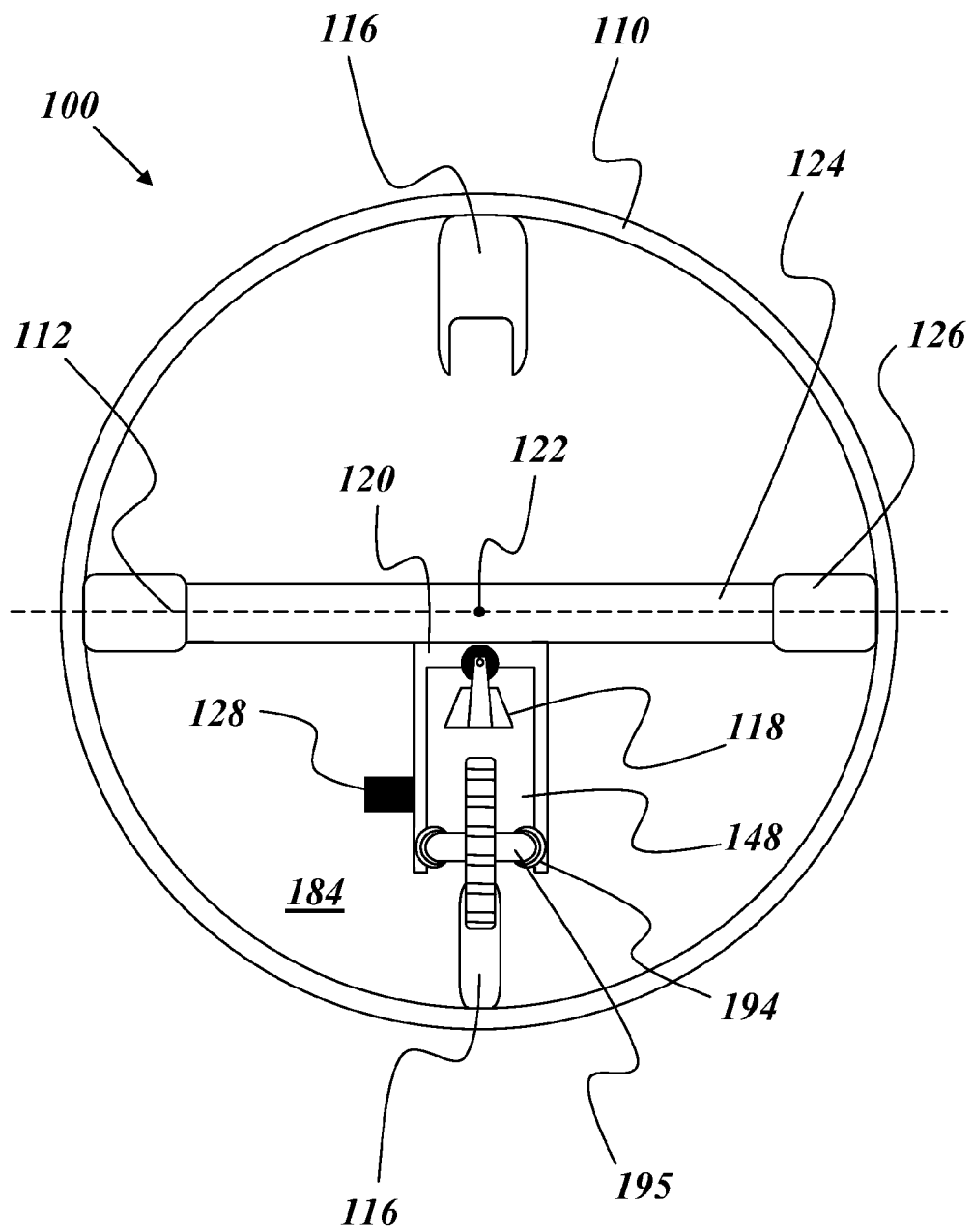
FIG. 16C is a cross-sectional view of an example robotic ball of FIG. 7D, further including one or more suspension mechanisms supporting and coupled to the rolling member, according to embodiments of the present invention.

Additionally or alternatively, the suspension mechanisms described herein, and/or other suspension mechanisms, can be included for suspending and supporting one or more of the rolling members 114. For example, FIG. 16C depicts the rolling member 114 coupled to and supported by one or more spiral suspensions 194. In particular, in the example embodiment of FIG. 16C, the spiral suspensions 194 are coupled to an axle 195 on the rolling member 114. Other suspension mechanisms, such as those depicted and described herein, can be used to support one, some, or all more of the rolling members 114, as would be appreciated by one of skill in the art upon reading the present specification.

In general, any such suspension mechanisms, including spiral suspensions, compressible portions, spring-based suspensions, soft layers, any other suspension mechanisms, or combinations thereof, can be included on just a single end of the horizontal portion 124, or can be included on both ends of the horizontal portion 124. Upon reading the present specification, one of skill in the art will appreciate a wide variety of additional suspension mechanisms suitable for use in various embodiments of the robotic ball device 100.

While the horizontal portion 124 has been described herein with reference to the example embodiments of the figures, it should be understood that the horizontal portion 124 can take on any suitable shape, size, and orientation. Similarly, the housing 110 can take any suitable shape, size, and orientation. The housing 110 can additionally include grooves, scores, bumps, recesses, treads with tread patterns, and/or any other surface irregularities for improving traction between the robotic ball device 100 and the ground or surface on which it is intended to roll. For example, the robotic ball device 100 can include a grooved annular band on an exterior face of the housing 110, and the grooved annular band can be centered on a vertical diameter of the housing 110 intended to be in contact with the ground or surface on which the robotic ball device 100 will roll.

Furthermore, the housing 110 can enclose a single interior volume of interior space or alternatively can enclose multiple interior volumes of interior spaces that are separated and discontinuous from one another. The housing 110 can generally form a thin or thick spherical shell (e.g., as depicted at least in the embodiment of FIGS. 4A through 4C). Alternatively, the housing 110 can include additional solid components coupled thereto or formed integral therewith.

Figure 17A:
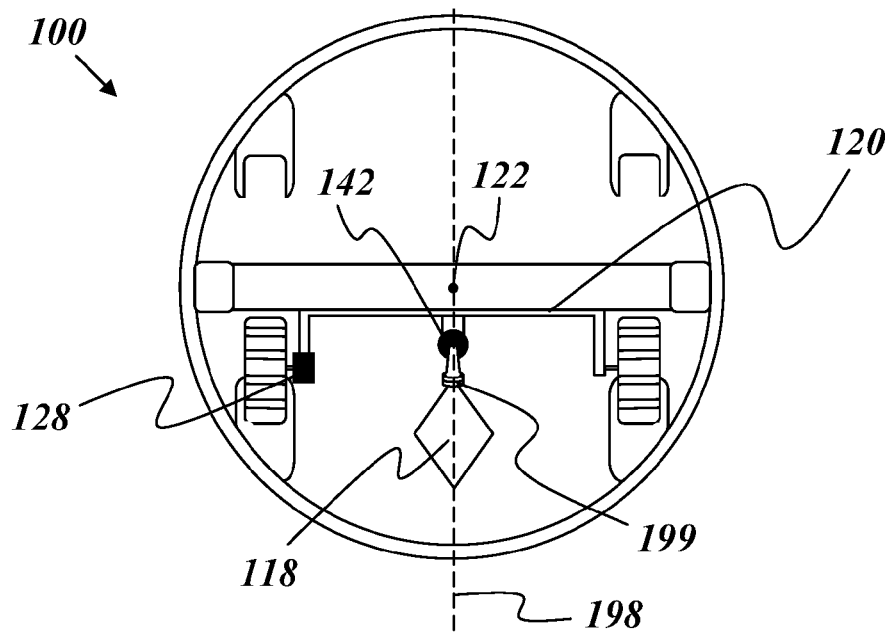
FIG. 17A is a cross-sectional view of an example robotic ball device having a weighted component configured for spinning motion, according to embodiments of the present invention.

FIG. 17A depicts an additional embodiment according to the present invention wherein the robotic ball device 100 further includes the weighted component 118 configured as a flywheel. In particular, the weighted component 118 can spin around an axis 198, which can be vertical or angled. The axis 198 can pass through the center point 122 of the robotic ball device 100, as depicted. The robotic ball device 100 can include one or more rotatable elements 199 rotatably coupling the weighted component 118 to the support structure 120. The rotatable elements 199 can include or be coupled to an actuator for actuating rotation thereof, which can be the actuator 128 or 142, or can be a different actuator. As illustrated in FIG. 17A, the rotatable elements 199 further can be coupled to the actuator 142 or otherwise configured for tilting, sliding, or other motion that allows for steering capability. Alternatively, the rotatable elements 199 can be fixed to the support structure 120 in a manner that does not allow for tilting or other motion for shifting the center of gravity of the robotic ball device 100.

During operation, rotation of the rotatable elements 199 and spinning of the weighted component 118 (e.g., as a flywheel) can provide the robotic ball device 100 with additional "upright" stability. Rotation of the weighted component 118 produces angular momentum, which resists changes caused by external torques, or "tipping" forces. Said differently, the angular momentum of the weighted component 118 produced by the rotation of the rotatable elements 199 causes the weighted component 118, and thus the entire robotic ball device 100, to tend to remain upright. In effect, when the weighted component 118 is spinning, it acts as a gyroscope that tends to maintain its upright orientation due to principles of conversation of angular momentum. During forward or backward linear motion of the robotic ball device 100, this tendency of the weighted component 118 to remain upright causes the robotic ball device 100 to resist forces that tend to cause the robotic ball device 100 to device from the forward or backward linear direction. Thus, such a "flywheel" configuration can be useful in some embodiments for providing the robotic ball device 100 with increased stability.

Figure 17B:
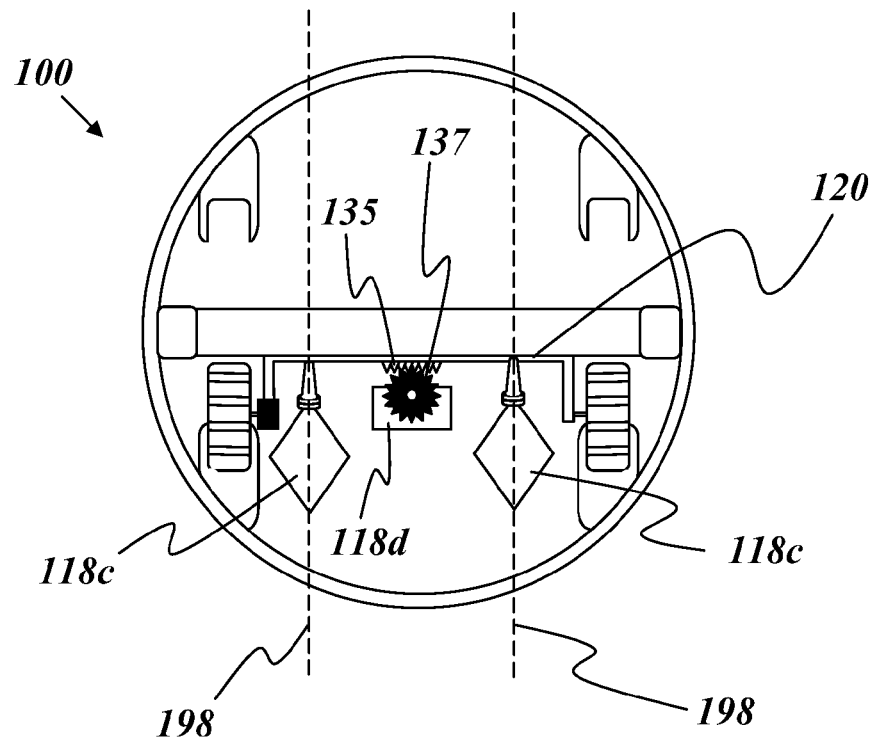
FIG. 17B is a cross-sectional view of an example robotic ball device an example robotic ball device having a first weighted component configured for spinning motion and a second weighted component configured to enable turning capability of the robotic ball device, according to embodiments of the present invention.

In yet other alternative embodiments, the robotic ball device 100 can include a plurality of weighted components 118, some of which are configured for rotation as a flywheel and others of which are configured to create shifts of the center of gravity of the robotic ball device 100. For example, FIG. 17B depicts one example of such an embodiment. The robotic ball device 100 includes weighted components 118*c* coupled to the support structure 120 via one or more rotatable elements 199 and configured to spin about their respective axes 198. The robotic ball device 100 additionally includes a different weighted component 118*d* that is movably coupled to the support structure 120, e.g., using the rack and pinion system previously described herein with respect to FIGS. 5A and 5B.

As previously described herein, any one or more of the additional features described herein with reference to the example embodiments of FIGS. 9 through 17B also can be mounted to or included in other different embodiments of the robotic ball device 100 provided herein. Furthermore, any one or more of the additional features described with reference to FIGS. 9 through 17B can be mounted to or included in a movable "car" for forming a "car-in-ball" embodiment of the robotic ball device 100.

Figure 18:
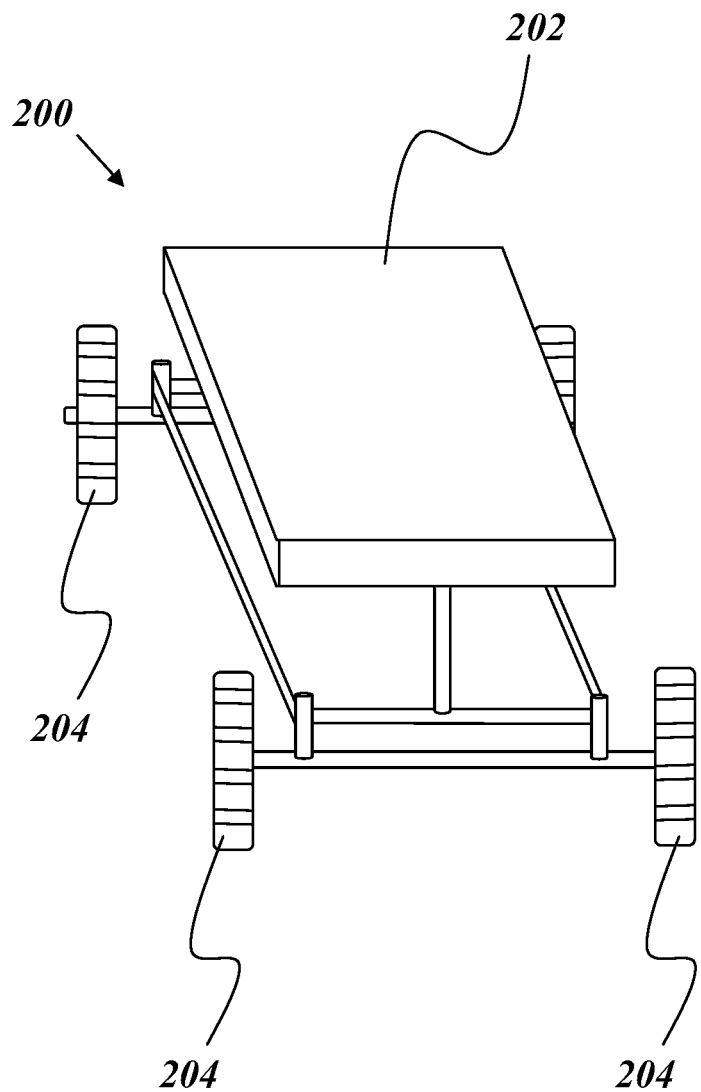
FIG. 18 is a perspective view of an example car for inclusion in certain embodiments of the present invention.

FIG. 18 depicts an example car 200 suitable for being included in yet further alternative embodiments according to the present invention. The car 200 includes a body 202 and a plurality of rolling members 204 coupled to the body 202. The rolling members 204 can include, as non-limiting examples, wheels, rollers, gears, pinions, balls, any other suitable rolling member, or combinations thereof. In an illustrative embodiment, the rolling members 204 include wheels having treads for improving traction with the inner face of the housing 110. The car 200 can be equipped with steering capabilities, speed control, and the like, as would be appreciated by one of skill in the art.

Figure 19:
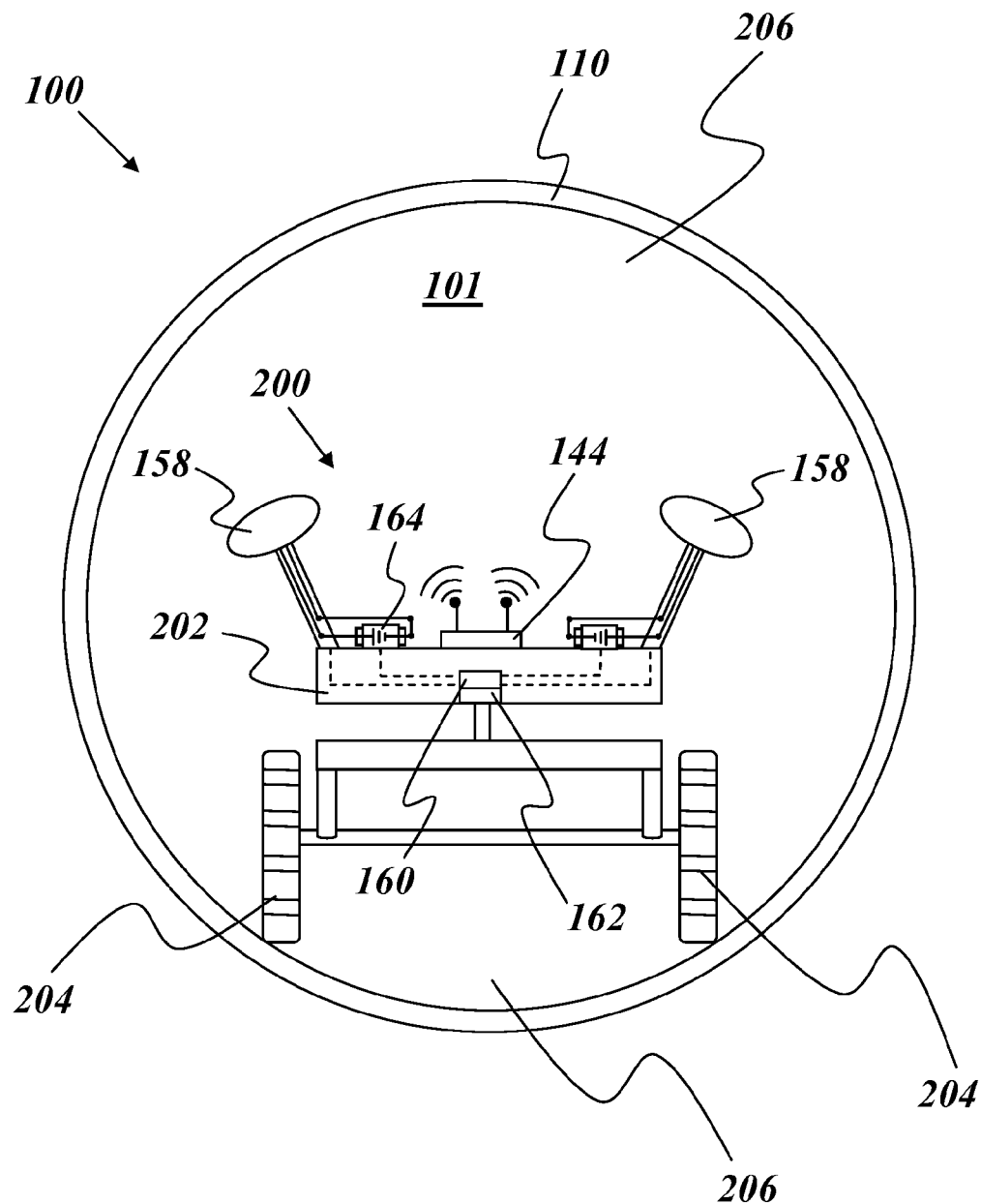
FIG. 19 is a cross-sectional view of an example robotic ball device containing the example car of FIG. 18, according to embodiments of the present invention.

FIG. 19 depicts an example robotic ball device 100 that includes the car 200, according to alternative embodiments of the present invention. The housing 110 can form a spherical shell, and the car 200 can be in contact with a curved (e.g., spherical) inner surface of the housing 110. The robotic ball device 100 generally can be propelled forward by actuated motion of the rolling members 204 on the car 200. The car 200 can be equipped for turning and/or steering. The robotic ball device 100 additionally can be provided with turning and/or steering capability through remote, autonomous, etc. control of turning motion by the car 200. For example, during forward motion of the robotic ball device 100, steered turning of the car 200 can result the robotic ball device 100 taking a similar turn. In yet further embodiments, the rolling members 204 are shaped to match the curvature of the portion of the housing 110 on which the rolling members 204 are disposed, such that each rolling member 204 includes an inward-facing surface having a first diameter and an outward-facing surface having a second diameter that is smaller than the first diameter.

Alternatively, the housing 110 of the robotic ball device 100 of FIG. 19 can include a horizontally flat portion (not shown) that extends circumferentially around a portion of the volume of interior space 101 enclosed by the housing 110, thereby forming an interior cylinder. In such embodiments, the car 200 can be situated on the horizontally flat portion.

In the example embodiment of FIG. 19, the car 200 includes one or more of the capacitive sensors 158 previously described herein, which can be mounted on the body 202 of the car 200. The capacitive sensors 158 can be coupled to one or more voltage sources 164 (such as a battery) that are included in or on the car 200. The car further can include a processor 160 and/or computer readable storage medium 162, e.g., both of which can be coupled to or housed within the body 202. The car 200 can include a communications device 144 that is logically connected to the processor 160, for transmitting and/or receiving signals, instructions, data, and the like.

The sensitivity of the capacitive sensors 158 can be controllable, as previously described herein with respect to FIG. 11. For instance, the sensitivity of the capacitive sensors 158 can be controlled by software and/or by circuitry. Software control over the capacitive sensors 158 can be enabled by the processor 160 and/or the computer readable storage medium 162, which can contain instructions stored on the computer readable storage medium 162 and executable by the processor 160. Execution of the instructions can cause the capacitive sensors 158 to exhibit particular desired levels of sensitivity. Specifically, the executed software program(s) can cause an input from signal of the capacitive sensors 158 to be filtered, averaged, and/or processed such that input signals having strengths below a threshold value are not detected. Software control can also be provided remotely, e.g., via a wireless connection between the communications device 144 and a remote computer, remote controller, etc.

Furthermore, the sensitivity of the capacitive sensors 158 can be adjusted and controlled using physical techniques. For example, the voltage level applied by the voltage sources 164 can be controlled by the processor 160. The processor 160 may adjust the voltage level applied by the one or more voltage sources 164 in response to executing one or more instructions stored on the computer readable storage medium 162, and/or in response to signals received by the communications device 144 from a remote device (e.g., from a remote computer, remote controller, satellite, GPS, etc.).

Embodiments of the present invention enable numerous benefits. For example, by including one or more rolling members 114 movably disposed on one or more defined pathways 116, the robotic ball device 100 can achieve greater durability, robustness, and usable lifetime. Furthermore, such features can allow the robotic ball device 100 to include a wide variety of additional components, such as the example components and features described with reference to FIGS. 9 through 17B, some of which enable yet further improved stability. In general, the suspensions mechanisms, the rolling members 114 rotatably disposed on the defined pathways 116, the support structure 120, and/or other features described herein can be included to achieve yet further improved performance and capabilities. Accordingly, robotic ball devices 100 according to embodiments of the present invention are capable of a wider range of applications and implementations.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A robotic ball device having a center point and a first axis of rotation passing through the center point around which the robotic ball device rotates during motion in a forward linear direction, the robotic ball device comprising:
a housing;
a defined pathway located on an inner face of the housing that forms a closed loop around the first axis of rotation;
a rolling member contained in the housing and movably disposed on the defined pathway;
an actuator coupled to the rolling member for actuating rotation of the rolling member;
a weighted component operationally coupled to the rolling member, the weighted component being sufficiently heavy to maintain the rolling member, during a motion in the forward linear direction, at a substantially constant angular position in a forward vertical plane dissecting the rolling member, relative to an origin in a moving frame of reference that moves with the robotic ball device; and
one or more capacitive sensors disposed inside the housing;
wherein the rolling member is vertically unaligned with the first axis of rotation.

2. The robotic ball device of claim 1, further comprising a support structure contained in the housing, wherein the support structure is coupled to the rolling member and the weighted component.

3. The robotic ball device of claim 2, further comprising one or more coupling pieces, and further wherein the support structure comprises a horizontal portion that is rotatably coupled to the housing by the one or more coupling pieces, the one or more coupling pieces being circumferentially aligned along the first axis of rotation.

4. The robotic ball device of claim 2, further comprising one or more compartments coupled to the support structure for containing one or more energy sources.

5. The robotic ball device of claim 1, further comprising one or more compartments disposed in or fixedly coupled to the housing for containing one or more energy sources.

6. The robotic ball device of claim 1, further comprising one or more additional defined pathways each formed on the inner face of the housing and each forming an additional closed loop around the first axis of rotation, and further comprising one or more additional rolling members rotatably disposed on the one or more additional defined pathways.

7. The robotic ball device of claim 1, wherein the housing comprises at least a portion forming a screen for displaying a projected display.

8. The robotic ball device of claim 1, further comprising a display system disposed inside the housing.

9. The robotic ball device of claim 8, wherein the display system comprises any one or more of the following: a projection unit, a flat display, and a lens.

10. The robotic ball device of claim 1, further comprising one or more cameras disposed inside the housing.

11. A robotic ball device, comprising:
a housing;
a car movably disposed on an inner face of the housing, the car comprising a body and one or more rolling members; and
one or more capacitive sensors coupled to the car;
the device further comprising a voltage source, a processor, and a communications device.

12. The robotic ball device of claim 11, further comprising a machine readable storage medium.

13. The robotic ball device of claim 12, further comprising instructions stored on the machine readable storage medium, the instructions causing a change in a sensitivity of at least one of the one or more capacitive sensors when executed by the processor.

14. The robotic ball device of claim 11, wherein the communications device is coupled to the processor, and further wherein the communications device is configured to receive one or more signals that cause the processor to change a sensitivity of at least one of the one or more capacitive sensors.

15. The robotic ball device of claim 11, wherein the one or more capacitive sensors are supplied by the voltage source having a voltage level sufficient to cause the one or more capacitive sensors to detect human contact with the housing.

16. A robotic ball device, comprising:
a housing;
one or more capacitive sensors; and
a voltage source coupled to the one or more capacitive sensors;

wherein the voltage source is configured to supply a voltage level sufficient to cause the one or more capacitive sensors to detect human contact with the housing.

17. The robotic ball device of claim 16, wherein the one or more capacitive sensors are coupled to the housing.

18. The robotic ball device of claim 16, further comprising a support structure coupled to an inner face of the housing, wherein the one or more capacitive sensors are coupled to the support structure.

19. The robotic ball device of claim 1, wherein the one or more capacitive sensors are supplied by a voltage source having a voltage level sufficient to cause the one or more capacitive sensors to detect human contact with the housing.

20. The robotic ball device of claim 1, further comprising a support structure coupled to an inner face of the housing, wherein the one or more capacitive sensors are coupled to the support structure.

* * * * *